US008811927B2

(12) United States Patent
Azadet et al.

(10) Patent No.: US 8,811,927 B2
(45) Date of Patent: Aug. 19, 2014

(54) METHOD FOR ESTIMATING A PLURALITY OF ESTIMATED TRANSFER FUNCTIONS CORRESPONDING TO WIRELESS CHANNELS IN A MULTIPLE-INPUT SYSTEM

(71) Applicant: Agere Systems LLC, Allentown, PA (US)

(72) Inventors: Kameran Azadet, Pasadena, CA (US); Samer Hijazi, San Jose, CA (US); Sunitha Kopparthi, Pompano Beach, FL (US); Albert Molina, Alicante (ES); Ramon Sanchez, Madrid (ES)

(73) Assignee: Agere Systems LLC, Allentown, PA (US)

( * ) Notice: Subject to any disclaimer, the term of this patent is extended or adjusted under 35 U.S.C. 154(b) by 0 days.

(21) Appl. No.: 13/968,939

(22) Filed: Aug. 16, 2013

(65) Prior Publication Data
US 2013/0336144 A1    Dec. 19, 2013

Related U.S. Application Data

(63) Continuation of application No. 13/617,229, filed on Sep. 14, 2012, now Pat. No. 8,515,376, which is a continuation of application No. 12/365,444, filed on Feb. 4, 2009, now Pat. No. 8,290,462.

(51) Int. Cl.
*H04B 1/06* (2006.01)

(52) U.S. Cl.
USPC .......................................... 455/272; 375/350

(58) Field of Classification Search
USPC .......................................... 455/272; 375/350
See application file for complete search history.

(56) References Cited

U.S. PATENT DOCUMENTS

| 6,654,408 B1 | 11/2003 | Kadous et al. |
| 7,852,906 B2 * | 12/2010 | Zhou et al. ................... 375/147 |
| 8,068,539 B2 * | 11/2011 | Molev-Shteiman et al. . 375/232 |
| 8,073,088 B2 * | 12/2011 | Badri-Hoeher et al. ...... 375/350 |

(Continued)

FOREIGN PATENT DOCUMENTS

| EP | 1860810 A1 | 11/2007 |
| WO | WO2006098011 A1 | 9/2006 |
| WO | WO2006098147 A1 | 9/2006 |

OTHER PUBLICATIONS

"UMTS Long Term Evolution (LTE) Technology Introduction;" Rohde & Schwarz; Application Note 1MA111; Jan. 2008; pp. 1-35.

(Continued)

*Primary Examiner* — Kenneth B. Wells
(74) *Attorney, Agent, or Firm* — Mendelsohn, Drucker & Dunleavy, P.C.; David L. Cargille; Steve Mendelsohn

(57) ABSTRACT

In one embodiment, a receiver is provided for use in a multiple-input system that includes a receiving antenna receiving a time-domain signal corresponding to a plurality of signals transmitted from a plurality of transmitting antennas. The receiver includes: (a) a transform unit adapted to transform the time-domain signal into a frequency-domain signal; (b) a channel estimation unit adapted to estimate, based on the frequency-domain signal and a frequency-domain pilot signal, a combined transfer function corresponding to a plurality of transfer functions of respective channels between the plurality of transmitting antennas and the receiving antenna; and (c) a channel separation unit including a plurality of frequency-domain convolution units that separate the combined transfer function into a plurality of estimated channel transfer functions.

10 Claims, 15 Drawing Sheets

(56) References Cited

U.S. PATENT DOCUMENTS

| | | | |
|---|---|---|---|
| 8,199,865 B2* | 6/2012 | Hui et al. | 375/355 |
| 8,290,462 B2* | 10/2012 | Azadet et al. | 455/272 |
| 8,396,169 B2* | 3/2013 | Xu et al. | 375/340 |
| 2004/0223561 A1 | 11/2004 | Tahat | |
| 2005/0073946 A1 | 4/2005 | Dey et al. | |
| 2005/0073947 A1 | 4/2005 | Dey et al. | |
| 2005/0105647 A1 | 5/2005 | Wilhelmsson et al. | |
| 2005/0251844 A1 | 11/2005 | Martone et al. | |
| 2006/0227748 A1 | 10/2006 | Stamoulis et al. | |
| 2007/0014272 A1 | 1/2007 | Palanki et al. | |
| 2007/0211806 A1 | 9/2007 | Mudulodu et al. | |
| 2007/0260431 A1 | 11/2007 | Ozluturk | |
| 2008/0031375 A1 | 2/2008 | Zhou et al. | |
| 2008/0063040 A1 | 3/2008 | Akahori | |
| 2008/0080636 A1 | 4/2008 | Sung et al. | |
| 2008/0101216 A1 | 5/2008 | Tanaka et al. | |
| 2008/0112386 A1 | 5/2008 | Ogawa et al. | |

OTHER PUBLICATIONS

"A Suitable Channel Equalization Scheme For IEEE 802.11B" by Eric Tell; Dept. of Electrical Engineering, SE-571 83 Linköping University, Sweden; 2003, (4 pages).

"Channel Estimation And Prediction In UMTS LTE" by Lathaharan Somasegaran; Aalborg University, Institute of Electronic Systems, Signal and Information Processing for Communications, 2007, pp. 1-89.

"Down-Sampled Impulse Response Least-Squares Channel Estimation For LTE OFDMA" by Andrea Ancora, Calogero Bona and Dirk T.M. Slock; 2007, (4 pages).

"Time And Frequency Domain Windowing Of LFM Pulses" by Mark A. Richards; Sep. 29, 2006; pp. 1-7.

"On Channel Estimation In OFDM Systems" by Jan-Jaap van de Beek, et al., In Proceedings of Vehicular Technology Conference (VTC '95),vol. 2, pp. 815-819, Chicago, USA, Sep. 1995.

"UTRAN Long Term Evolution In 3GPP" by Antti Toskala, et al, 17th Annual IEEE International Symposium on Personal, Indoor and Mobile Radio Communications (PIMRC'06), 2006 IEEE (5 pages).

"Wireless Broadband Single-Carrier Systems With MMSE Turbo Equalization Receivers" by Kimmo Kansanen, Oulun Yliopisto, Oulu 2005, pp. 1-147.

"Channel Tracking versus Frequency Hopping for Uplink LTE" by Ken Eriksson, Master's Degree Project, Stockholm, Sweden, Mar. 2007, pp. 1-34.

Non-Final Office Action; Mailed Oct. 13, 2011 for corresponding U.S. Appl. No. 12/365,444.

Final Office Action; Mailed Apr. 13, 2012 for corresponding U.S. Appl. No. 12/365,444.

Restriction Requirement; Mailed Jul. 7, 2011 for corresponding U.S. Appl. No. 12/365,444.

Notice of Allowance; Mailed Jun. 21, 2012 for corresponding U.S. Appl. No. 12/365,444.

Non-Final Office Action; Mailed Nov. 8, 2012 for corresponding U.S. Appl. No. 13/617,229.

Notice of Allowance; Mailed Apr. 16, 2013 for corresponding U.S. Appl. No. 13/617,229.

\* cited by examiner

500

FIG. 7
TABLE 1
COMPLEXITY ANALYSIS OF TIME-DOMAIN METHODS

| OPERATION | WM WITH MMSE ESTIMATION (WMMSE) | WM WITH LS ESTIMATION (WMLS) | WM WITH MF ESTIMATION (WMMF) | WMFT |
|---|---|---|---|---|
| DFT OF THE RECEIVED REFERENCE SIGNALS | $O(M\log M)$ | $O(M\log M)$ | $O(M\log M)$ | $O(M\log M)$ |
| COMPUTATION OF MATRIX $R_{YY}^{-1}$ | $O(M^3)$ | – | – | – |
| ESTIMATION | $T_N O(M)$ | $T_N O(M)$ | $O(M)$ | $O(M)$ |
| IDFT OF THE ESTIMATION OUTPUT | $O(ML)$ | $O(ML)$ | $O(M\log M)$ | $O(ML)$ |
| CHANNEL FREQUENCY RESPONSE | $T_N \times O(M\log M)$ | $T_N \times O(M\log M)$ | $T_N \times O(M\log M)$ | $T_N \times O(M\log M)$ |

702 — DFT OF THE RECEIVED REFERENCE SIGNALS
704 — COMPUTATION OF MATRIX $R_{YY}^{-1}$
706 — ESTIMATION
708 — IDFT OF THE ESTIMATION OUTPUT
710 — CHANNEL FREQUENCY RESPONSE

FIG. 8

TABLE 2
COMPLEXITY ANALYSIS OF FREQUENCY-DOMAIN METHODS

| OPERATION | FDM | FDMFFC | MFDMFFC |
|---|---|---|---|
| DFT OF THE RECEIVED REFERENCE SIGNALS | $O(M\log M)$ | $O(M\log M)$ | $O(M\log M)$ |
| ESTIMATION BY MATCHED FILTER | $O(M)$ | $O(M)$ | $O(M)$ |
| CONVOLVING MATCHED FILTER WITH SINC | $T_N \times O(M\log M)$ | $T_N O(ML)$ | $T_N O(ML)$ |

FIG. 11

TABLE 3

OPTIMUM CHANNEL ORDER FOR DIFFERENT SNR
FOR WMMSE, WMLS, WMMF, AND WMFT WHEN $M_u$ IS 72 AND 576

| SNR (dB) | OPTIMUM CHANNEL ORDER (L) | | | | | | | |
|---|---|---|---|---|---|---|---|---|
| | $M_u = 72$ | | | | $M_u = 576$ | | | |
| | WMMSE | WMLS | WMMF | WMFT | WMMMSE | WMLS | WMMF | WMFT |
| 1 | 1 | 1 | 18 | 1 | 1 | 1 | 144 | 1 |
| 8 | 5 | 5 | 18 | 5 | 62 | 62 | 144 | 62 |
| 15 | 7 | 7 | 18 | 7 | 70 | 70 | 144 | 70 |

FIG. 14

TABLE 4

OPTIMUM CHANNEL ORDER FOR DIFFERENT SNR FOR WMMF, WMFT, FDM, AND FDMFFC WHEN $M_u$ = 72, 576

| SNR (dB) | OPTIMUM CHANNEL ORDER (L) | | | | | | | |
|---|---|---|---|---|---|---|---|---|
| | $M_u$ = 72 | | | | $M_u$ = 576 | | | |
| | WMMF | WMFT | FDM | FDM FFC | WMMF | WMFT | FDM | FDM FFC |
| 1 | 18 | 7 | 4 | 6 | 144 | 70 | 4 | 4 |
| 8 | 18 | 7 | 4 | 10 | 144 | 70 | 5 | 9 |
| 15 | 18 | 7 | 5 | 11 | 144 | 70 | 6 | 11 |

METHOD FOR ESTIMATING A PLURALITY OF ESTIMATED TRANSFER FUNCTIONS CORRESPONDING TO WIRELESS CHANNELS IN A MULTIPLE-INPUT SYSTEM

CROSS-REFERENCE TO RELATED APPLICATIONS

This is a continuation of application Ser. No. 13/617,229, filed on Sep. 14, 2012, and issued as U.S. Pat. No. 8,515,376 B2, which is a continuation of application Ser. No. 12/365,444, filed on Feb. 4, 2009, and issued as U.S. Pat. No. 8,290,462, the teachings of which are incorporated herein by reference.

BACKGROUND OF THE INVENTION

1. Field of the Invention

The present invention relates to channel estimation in a wireless communications system, and, in particular, in a UMTS Long Term Evolution (LTE) system uplink.

2. Description of the Related Art

The Universal Mobile Telecommunications System (UMTS) is a high-speed cellular radio system that provides digital data and voice communications. UMTS has recently evolved from 3G systems to 3.5G systems using High-Speed Downlink Packet Access (HSDPA) and High-Speed Uplink Packet Access (HSUPA), and still continues to evolve. The UMTS Long Term Evolution (LTE) protocol is currently being specified in 3GPP Release 8 to ensure its competitiveness for the next ten years and beyond. LTE, which is also known as Evolved UMTS Terrestrial Radio Access (UTRA) and Evolved UMTS Terrestrial Radio Access Network (UTRAN), provides new physical-layer concepts and protocol architectures for UMTS. See, e.g., Application Note 1MA111, "UMTS Long Term Evolution (LTE) Technology Introduction," Rohde & Schwarz GmbH & Co. KG, available at http://www2.rohde-schwarz.com/en/service_and_support/Downloads/Application_Notes/, hereby incorporated by reference in its entirety.

According to the 3GPP Release 8 standard, the LTE downlink uses Orthogonal Frequency-Division Multiple Access (OFDMA). The LTE uplink uses Single-Carrier FDMA (SC-FDMA), which allows a low-complexity receiver implementation in the base station.

FIG. 1 depicts a simplified block diagram of an LTE uplink 100, including an LTE uplink transmitter 110 (e.g., located in a UMTS mobile terminal) and an LTE uplink receiver 130 (e.g., located in a UMTS base station). In transmitter 110, serial data 112 to be transmitted is quadrature-amplitude-modulation (QAM) modulated by modulator 114 and converted into N parallel streams by serial-to-parallel converter 116. The N parallel streams are then input to an inverse fast Fourier transform (IFFT) unit 118, which uses the N parallel streams as bins to create a block of N OFDM symbols, each mapped to a different subcarrier frequency. The N OFDM symbols output from IFFT unit 118 are serialized by parallel-to-serial converter 120 to create a time-domain OFDM signal, and cyclic extension unit 122 adds to the time-domain OFDM signal a cyclic prefix that provides guard time to reduce intersymbol interference. Finally, the time-domain OFDM signal is transmitted over the LTE uplink.

In receiver 130, the transmitted signal is received and input to cyclic extension unit 132, which removes the cyclic extension. The resulting signal is converted into N parallel OFDM symbols at serial-to-parallel converter 134, and the N parallel OFDM symbols are input to fast Fourier transform (FFT) unit 136, which removes the N subcarrier frequencies and outputs N parallel words. The N parallel words are then input to (i) a parallel-to-serial converter 138, which converts the N parallel words to serial data, and (ii) a channel estimator unit 140, which outputs, for each parallel word, an estimated channel transfer function, based on a locally generated pilot signal and a copy of the pilot signal contained within the received signal. M-point IDFT and equalizer unit 142 then separates the serial data for each channel via an M-point IDFT and equalizes the serial data for each channel, based on the corresponding estimated channel transfer function from channel estimator unit 140. In a single-input, single-output (SISO) system having a single transmission channel from a single transmitter antenna to a single receiver antenna, channel estimator 140 generates an estimated channel transfer function corresponding to the single transmission channel. The equalized serial data for each channel is then demodulated by QAM demodulator unit 144 to recover data 146.

To assist with channel estimation, the LTE uplink protocol includes the transmission of known pilot signals at regular intervals, along with data signals. As described above, channel estimator 140 in receiver 130 uses these transmitted pilot signals to estimate channel characteristics in the LTE uplink. M-point IDFT and equalizer unit 142 in receiver 130 then uses the channel estimates to improve the accuracy of the data reception and demodulation. Conventional techniques for channel estimation, e.g., the Minimum Mean Square Error (MMSE) and Least Squares (LS) techniques, are computationally expensive, however.

An LTE uplink may also include advanced antenna technologies, such as Multiple Input Multiple Output (MIMO). See, e.g., A. Toskala et al., "Utran Long Term Evolution in 3GPP," IEEE 17th International Symposium on Personal, Indoor and Mobile Radio Communications, pp. 1-5, Sep. 2006, hereby incorporated by reference in its entirety. In a MIMO-based system, there are at least two transmitter antennas and at least two receiver antennas.

FIG. 2 represents a two-by-two MIMO LTE system 200 having two transmitter antennas 202 and 204, which transmit signals over four transmission paths 206, 208, 210, and 212 to two receiver antennas 214 and 216, where each receiver antenna 214, 216 receives a signal corresponding to the superposition of signals arriving over two different transmission paths. For example, the signal received at receiver antenna 214 corresponds to the superposition of (i) the signal transmitted from transmitter antenna 202 via transmission path 206 and (ii) the signal transmitted from transmitter antenna 204 via transmission path 208. In general, each transmitter antenna 202, 204 is associated with its own transmitter analogous to transmitter 110 of FIG. 1, and each receiver antenna 214, 216 is associated with its own receiver analogous to receiver 130 of FIG. 1.

In order to separate the transmitted pilot signals from each MIMO transmitter antenna 202, 204 received at each receiver antenna 214, 216, MIMO LTE system 200 may employ cyclic-shift transmit diversity (CSTD). CSTD is an adaptation of the idea of delay diversity to OFDM systems. With CSTD, each antenna element in a transmit array sends a circularly shifted version of the same OFDM time-domain symbol. For each transmitter antenna, a cyclic prefix is added after circularly shifting the OFDM symbol. See, e.g., Javvin Technologies, Inc., Wireless Technology Terms, Glossary and Dictionary, at http://www.javvin.com/wireless/CSTD.html. For example, constant-amplitude zero-autocorrelation (CAZAC) sequences may be employed to provide a CSTD transmission scheme. Thus, in MIMO LTE system 200, the signal transmitted by transmitter antenna 204 is a circularly shifted version of the signal transmitted by transmitter antenna 202.

The pilot signals received at each receiver antenna may be separated by converting the OFDM signals into the time domain and performing windowing operations based on the cyclic shift. For example, U.S. Patent Application Publication No. US 2008/0031375 filed by Zhou et al. (hereinafter, "Zhou"), hereby incorporated by reference in its entirety, describes a channel estimation and separation method in a MIMO-OFDM system. The Zhou method includes (a) Fourier-transforming a plurality of signals received by a receiving antenna; (b) performing channel estimation by a least-squares method based on a known pilot signal; (c) inverse-Fourier-transforming the least-squares channel estimates into an impulse response in the time domain; (d) separating the transformed impulse response into channel impulse responses of the respective signals by use of a window function having a low-pass filter characteristic; and finally (e) obtaining frequency-domain estimated transfer functions for each channel by Fourier-transforming each of the channel impulse responses. The Zhou method, however, is computationally expensive and requires extensive processing resources.

SUMMARY OF THE INVENTION

In one embodiment, problems in the prior art are addressed by performing channel estimation in the frequency domain using a matched filter, which is computationally inexpensive. Further, channel separation is performed in the frequency domain, rather than in the time domain. By performing both channel estimation and channel separation in the frequency domain, the Fourier transform and the inverse Fourier transform found in the prior art may be eliminated. As a result, a channel estimator in accordance with one embodiment of the invention is simple and efficient.

Thus, in one embodiment, the invention is a receiver for use in a multiple-input system that includes a receiving antenna receiving a time-domain signal corresponding to a plurality of signals transmitted from a plurality of transmitting antennas. The receiver comprises: a transform unit adapted to transform the time-domain signal into a frequency-domain signal; a channel estimation unit adapted to estimate, based on the frequency-domain signal and a frequency-domain pilot signal, a combined transfer function corresponding to a plurality of transfer functions of respective channels between the plurality of transmitting antennas and the receiving antenna; and a channel separation unit including a plurality of frequency-domain convolution units that separate the combined transfer function into a plurality of estimated channel transfer functions.

In another embodiment, the invention is a receiver for use in a multiple-input system that includes a receiving antenna receiving a time-domain signal corresponding to a plurality of signals transmitted from a plurality of transmitting antennas. The receiver comprises: a transform unit adapted to transform time-domain signal into a frequency-domain signal; a matched-filter unit adapted to estimate, based on the frequency-domain signal and the frequency-domain pilot signal, a combined transfer function corresponding to a plurality of transfer functions of respective channels between the plurality of transmitting antennas and the receiving antenna; and a channel separation unit adapted to separate the combined transfer function into a plurality of estimated channel transfer functions.

In yet another embodiment, the invention is a method of estimating a plurality of estimated transfer functions corresponding to a plurality of wireless channels in a multiple-input system that includes a receiving antenna receiving a time-domain signal corresponding to a plurality of signals transmitted from a plurality of transmitting antennas. The time-domain signal are transformed into a frequency-domain signal. Based on the frequency-domain signal and a frequency-domain pilot signal, a combined transfer function corresponding to a plurality of transfer functions of respective channels between the plurality of transmitting antennas and the receiving antenna is estimated. The combined transfer function into a plurality of estimated channel transfer functions are separated by convolving, in the frequency domain, the combined transfer function with a plurality of windowing functions.

In still another embodiment, the invention is a method of estimating a plurality of estimated transfer functions corresponding to a plurality of wireless channels in a multiple-input system that includes a receiving antenna receiving a time-domain signal corresponding to a plurality of signals transmitted from a plurality of transmitting antennas. The time-domain signal is transformed into a frequency-domain signal. A combined transfer function corresponding to a plurality of transfer functions of respective channels between the plurality of transmitting antennas and the receiving antenna is estimated by performing a matched-filter operation on the frequency-domain signal and the frequency-domain pilot signal; and the combined transfer function is separated into a plurality of estimated channel transfer functions.

BRIEF DESCRIPTION OF THE DRAWINGS

Other aspects, features, and advantages of the present invention will become more fully apparent from the following detailed description, the appended claims, and the accompanying drawings, in which like reference numerals identify similar or identical elements.

FIG. 7 is a table comparing the computational complexities of various time-domain estimation methods.

FIG. 8 is a table comparing the computational complexities of various frequency-domain estimation methods.

FIG. 11 is a table comparing the error variance with regard to various numbers of taps and various signal-to-noise ratios for various time-domain estimation methods.

FIG. 14 is a table comparing the error variance with regard to various numbers of taps and various signal-to-noise ratios for various time-domain and frequency-domain estimation methods.

DETAILED DESCRIPTION OF THE INVENTION

Figure 3:
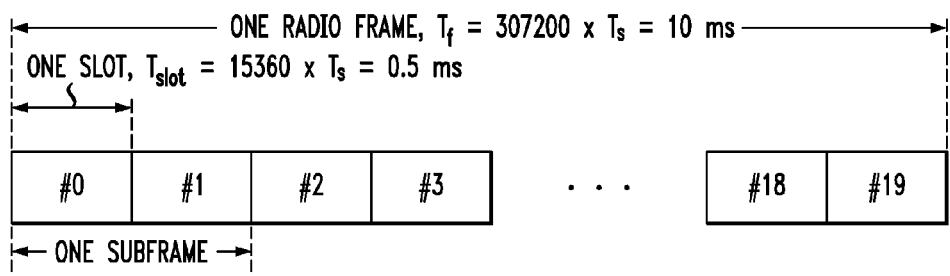
FIG. 3 is a timing diagram illustrating the structure of a radio frame in an LTE uplink.

FIG. 3 shows the structure of an exemplary radio frame (known as a "type 1" radio frame) in an LTE system. This frame structure is applicable to both frequency-division duplex (FDD) and time-division duplex (TDD) LTE systems. Each radio frame is $T_f = 307200 \times T_s = 10$ ms long and consists of 20 slots of length $T_{slot} = 15360 \times T_s = 0.5$ ms, numbered from 0 to 19. A sub-frame is defined as two consecutive slots. Depending on the cyclic prefix length, each slot consists of 6 or 7 OFDM symbols for an extended or normal cyclic prefix, respectively. Assuming that the system uses a normal cyclic prefix, such that each slot has 7 OFDM symbols, the pilot signals transmitted for channel estimation occupy the fourth OFDM symbol.

A received signal y is the sum of (i) the convolution of an input pilot signal x with the channel impulse response h and (ii) Gaussian noise n as shown in Equation (1) below:

$$y = x * h + n \qquad (1)$$

Equation (1) can be written in the frequency domain as shown in Equation (2) below:

$$\vec{Y} = \vec{X}\vec{H} + \vec{N} \qquad (2)$$

where $\vec{Y}$, $\vec{X}$, $\vec{H}$, and $\vec{N}$ respectively represent the received signal, transmitted signal, channel frequency response, and noise, all in the frequency domain. Equation (2) can be expressed as shown in Equation (3) below:

$$\begin{bmatrix} y_1 \\ y_2 \\ \vdots \\ y_M \end{bmatrix} = \begin{bmatrix} x_1 & & & 0 \\ & x_2 & & \\ & & \ddots & \\ 0 & & & x_M \end{bmatrix} \begin{bmatrix} h_1 \\ h_2 \\ \vdots \\ h_M \end{bmatrix} + \begin{bmatrix} n_1 \\ n_2 \\ \vdots \\ n_M \end{bmatrix}, \qquad (3)$$

where the pilot signal x is placed along the diagonal elements of the matrix $\vec{X}$. See, e.g., L. Somasegaran, "Channel Estimation and Prediction in UMTS LTE," M. S. Thesis, Dept. of Electronic Systems, Aalborg Univ., Aalborg, Denmark, 2007 (hereinafter, "Somasegaran"), hereby incorporated by reference in its entirety. Equation (2) can also be represented as shown in Equation (4) below:

$$\vec{Y} = \vec{X}\vec{H} + \vec{N} \qquad (4)$$

where $\vec{H} = \vec{W}\vec{C}$, and $\vec{W}$ is the discrete Fourier transform (DFT) matrix defined as $$W = \frac{1}{\sqrt{M_u}} e^{\frac{-2j\pi i k}{M_u}}$$

for $i = 0, \ldots, M_u - 1$; $k = 0, \ldots, L-1$, where $M_u$ is the length of the pilot signal, and L is the number of taps. $\vec{C}$ is the channel impulse response with L taps.

Figure 2:
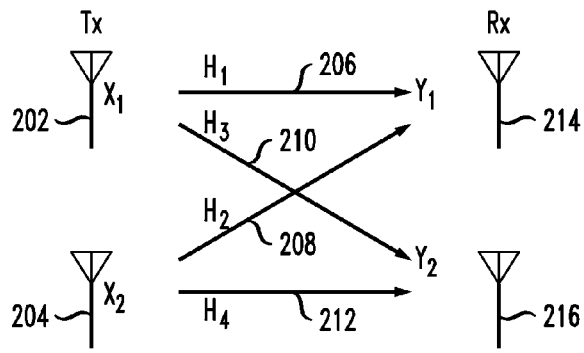
FIG. 2 is a block diagram illustrating a MIMO system with two transmitter antennas and two receiver antennas.

FIG. 2 shows a multiple-input, multiple-output (MIMO) system with two transmitter antennas 202, 204 and two receiver antennas 214, 216. The received signal can be expressed as shown in Equation (5) below:

$$\vec{Y}_1 = \begin{bmatrix} \vec{X}_1 & \vec{X}_2 \end{bmatrix} \begin{bmatrix} \vec{H}_1 \\ \vec{H}_2 \end{bmatrix} + \begin{bmatrix} \vec{N}_1 \\ \vec{N}_2 \end{bmatrix}, \vec{Y}_2 = \begin{bmatrix} \vec{X}_1 & \vec{X}_2 \end{bmatrix} \begin{bmatrix} \vec{H}_3 \\ \vec{H}_4 \end{bmatrix} + \begin{bmatrix} \vec{N}_3 \\ \vec{N}_4 \end{bmatrix} \qquad (5)$$

where $$\vec{Y}_1 = [y_{11} \; y_{12} \; \cdots \; y_{1M}]^T, \vec{Y}_2 = [y_{21} \; y_{22} \; \cdots \; y_{2M}]^T$$

$$\begin{bmatrix} \vec{X}_1 & \vec{X}_2 \end{bmatrix} = \begin{bmatrix} x_{11} & 0 & x_{21} & 0 \\ & x_{12} & & x_{22} \\ & & \ddots & & \ddots \\ 0 & & x_{1M} & 0 & x_{2M} \end{bmatrix},$$

$$\begin{bmatrix} \vec{H}_1 \\ \vec{H}_2 \end{bmatrix} = [h_{11} \; h_{12} \; \cdots \; h_{1M} \; h_{21} \; h_{22} \; \cdots \; h_{2M}]^T,$$

$$\begin{bmatrix} \vec{H}_3 \\ \vec{H}_4 \end{bmatrix} = [h_{31} \; h_{32} \; \cdots \; h_{3M} \; h_{41} \; h_{42} \; \cdots \; h_{4M}]^T,$$

$$\begin{bmatrix} \vec{N}_1 \\ \vec{N}_2 \end{bmatrix} = [n_{11} \; n_{12} \; \cdots \; n_{1M} \; n_{21} \; n_{22} \; \cdots \; n_{2M}]^T,$$

$$\begin{bmatrix} \vec{N}_3 \\ \vec{N}_4 \end{bmatrix} = [n_{31} \; n_{32} \; \cdots \; n_{3M} \; n_{41} \; n_{42} \; \cdots \; n_{4M}]^T.$$

In Equation (5), $\vec{X}_1$ and $\vec{X}_2$ respectively represent the data transmitted from antennas 202 and 204 in FIG. 2, $\vec{Y}_1$ and $\vec{Y}_2$ respectively represent the data received at antennas 214 and 216 in FIG. 2, $\vec{H}_1$, $\vec{H}_2$, $\vec{H}_3$, and $\vec{H}_4$ denote the channel frequency responses between the transmitter and receiver antennas over channels 206, 208, 210, and 212, respectively, and $\vec{N}_1$, $\vec{N}_2$, $\vec{N}_3$, and $\vec{N}_4$ denote Gaussian noise over those same channels. Equation (5) can further be simplified as shown in Equation (6) below:

$$\vec{Y}_1 = [\vec{X}_1 \ \vec{X}_2] \begin{bmatrix} W\vec{C}_1 \\ W\vec{C}_2 \end{bmatrix} + \begin{bmatrix} \vec{N}_1 \\ \vec{N}_2 \end{bmatrix} \quad (6)$$

$$= [\vec{X}_1 \ \vec{X}_2] \begin{bmatrix} W & 0 \\ 0 & W \end{bmatrix} \begin{bmatrix} \vec{C}_1 \\ \vec{C}_2 \end{bmatrix} + \begin{bmatrix} \vec{N}_1 \\ \vec{N}_2 \end{bmatrix}$$

$$= \vec{E}F \begin{bmatrix} \vec{C}_1 \\ \vec{C}_2 \end{bmatrix} + \begin{bmatrix} \vec{N}_1 \\ \vec{N}_2 \end{bmatrix}$$

$$\vec{Y}_2 = \vec{E}F \begin{bmatrix} \vec{C}_3 \\ \vec{C}_4 \end{bmatrix} + \begin{bmatrix} \vec{N}_3 \\ \vec{N}_4 \end{bmatrix}$$

$$\text{where } \vec{E} = [\vec{X}_1 \ \vec{X}_2] \text{ and } \vec{F} = \begin{bmatrix} W & 0 \\ 0 & W \end{bmatrix} \quad (7)$$

In Equations (6) and (7), $\vec{W}$ denotes the DFT matrix, and $\vec{C}_1$, $\vec{C}_2$, $\vec{C}_3$, and $\vec{C}_4$ denote the impulse responses of the channels between the transmitter and receiver antennas. $\vec{E}$ denotes the transmitted data, and $\vec{F}$ denotes the DFT matrices of all the transmitters.

Equation (6) will have a unique solution if and only if $$L \le \frac{M_u}{T_N},$$

where $T_N$ denotes the number of transmitters, $M_u$ is the length of the pilot signal, and L is the number of taps. This problem has been solved using least-squares and minimum mean square error methods in various publications, including: (a) Somasegaran; (b) A. Ancora et al., "Down-Samples Impulse Response Least-Squares Channel Estimation for LTE OFDMA," IEEE International conference on Acoustics, Speech and Signal Processing, vol. 3, pp. 293-296, April 2007 (hereinafter, "Ancora"); (c) J. V. D. Beek et al., "On Channel Estimation in OFDM Systems," In Proceeding of Vehicular Technology Conference, vol. 2, pp. 815-819, September 1995 (hereinafter, "Beek"); (d) U.S. Patent Application No. US 2007/0014272 A1, entitled "Pilot and Data Transmission in a Quasi-Orthogonal Single-Carrier Frequency Division Multiple Access System," by R. Palanki et al., published Jan. 18, 2007 (hereinafter, "Palanki"); and (e) K. Eriksson, "Channel Tracking versus Frequency Hopping for Uplink LTE." M.S. project, KTH School of Electrical Engineering, Stockholm, Sweden, 2007 (hereinafter, "Eriksson"). Ancora, Beek, Palanki, and Eriksson are hereby incorporated by reference in their entirety.

In particular, for a channel estimator employing MMSE estimation in the time domain, and assuming that the channel vector $\vec{C}$ is Gaussian and independent of channel noise N, the MMSE estimate $\hat{\vec{C}}$ is given by Equation (8) below:

$$\hat{\vec{C}} = \vec{R}_{cy}\vec{R}_{yy}^{-1}\vec{Y}, \text{ where} \quad (8)$$

$$\vec{R}_{cy} = E\{\vec{C}\vec{Y}^H\} = \vec{R}_{cc}\vec{F}^H\vec{E}^H, \text{ and}$$

$$\vec{R}_{yy} = E\{\vec{Y}\vec{Y}^H\} = \vec{E}\,\vec{F}\,\vec{R}_{cc}\vec{F}^H\vec{E}^H + \sigma_n^2 \vec{I}_M,$$

where $\vec{Y}$ is the received signal, $\vec{R}_{cy}$ is the cross-covariance matrix between the channel vector $\vec{C}$ and the received signal $\vec{Y}$, and $\vec{R}_{yy}$ is the auto-covariance matrix of the received signal $\vec{Y}$. $\vec{R}_{cc}$ is the auto-covariance matrix of the channel vector $\vec{C}$, $\sigma_n^2$ denotes the noise variance, $\vec{E}$ and $\vec{F}$ respectively denote the transmitted data and the DFT matrices of all the transmitters, as defined in Equation (7) above, H denotes the Hermitian conjugate operator, and $\vec{I}_M$ is the identity matrix. See, e.g., Beek.

Further, for a channel estimator employing LS estimation in the time domain, the LS estimator $\hat{C}$ for impulse response can be expressed as shown in Equation (9):

$$\hat{C} = ((EF)^H(EF))^{-1}(EF)^H \vec{Y} \quad (9)$$

$$= (F^H E^H E F)^{-1} F^H E^H \vec{Y} = M_u F^H E^H \vec{Y}$$

where $\vec{Y}$ is the received signal, $\vec{E}$ and $\vec{F}$, respectively, denote the transmitted data and the DFT matrices of all the transmitters, as defined in Equation (7) above, H denotes the Hermitian conjugate operator, and $M_u$ is the length of the pilot signal. See, e.g., Palanki.

In certain embodiments of the present invention, uplink channels in a MIMO LTE system employing cyclic-shift transmit diversity (CSTD) are estimated using various new methods for channel estimation in the time and frequency domains.

Figure 4:
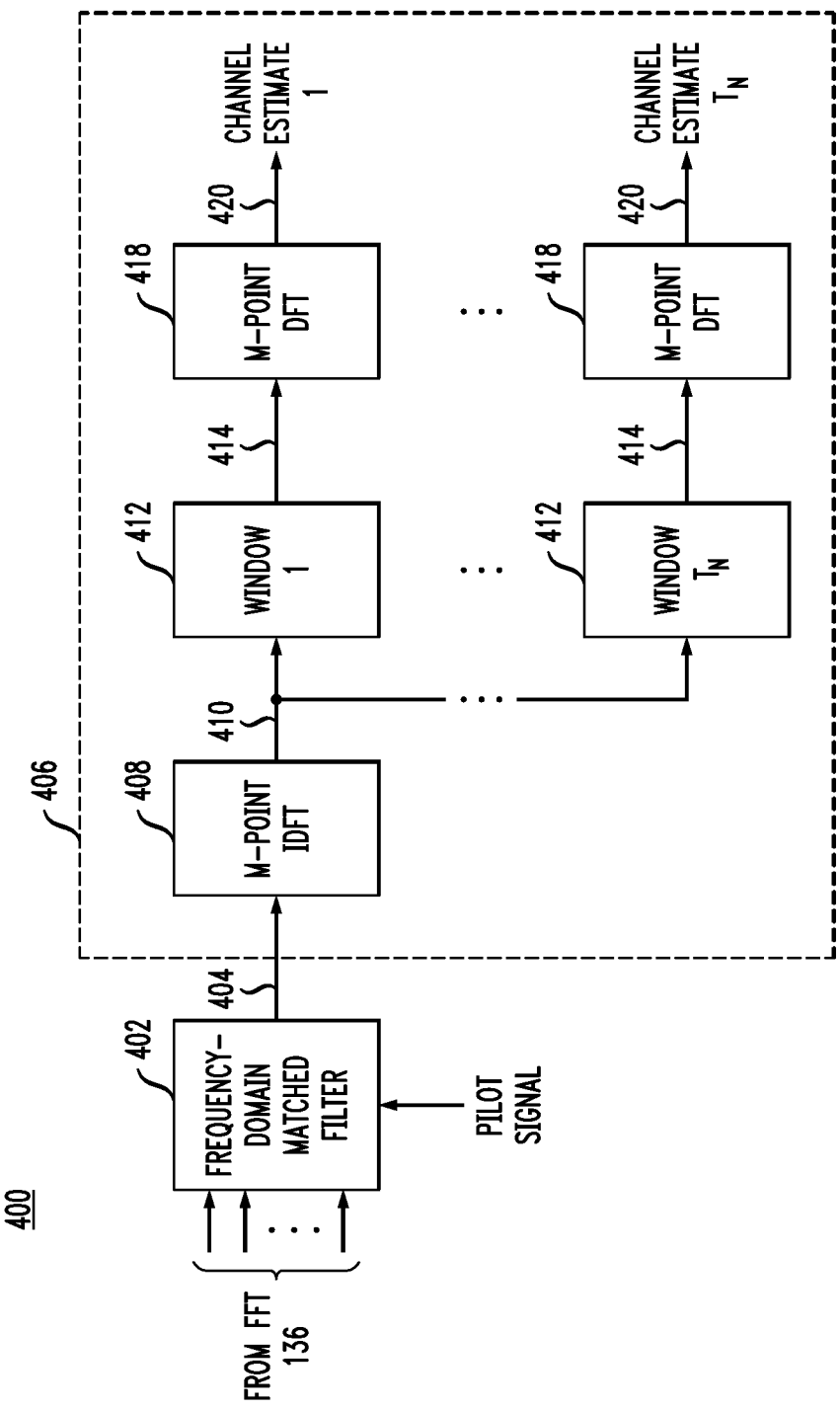
FIG. 4 is a block diagram of a channel estimator employing windowing in the time domain in accordance with one embodiment of the invention.

FIG. 4 shows a block diagram of channel estimator 400, which performs a windowing method (WM) for channel estimation, according to one embodiment of the present invention. Channel estimator 400 may be used to implement channel estimator 140 in receiver 130 of FIG. 1. Channel estimator 400 includes an estimation unit 402 and a channel separation unit 406. Channel separation unit 406 includes an M-point inverse discrete Fourier transform (IDFT) unit 408, $T_N$ windowing units 412, and $T_N$ corresponding M-point (DFT) units 418, wherein $T_N$ corresponds to the number of transmitter antennas in the MIMO system.

Estimation unit 402 is preferably implemented as a frequency-domain matched filter, as shown in FIG. 4. Generally, a matched filter is a filter that correlates a known signal with an unknown signal, conventionally to detect the presence of the known signal in the unknown signal. In the time domain, a matched filter is equivalent to convolving the unknown signal with a time-reversed version of the template (e.g., cross-correlation). A frequency-domain matched filter may be implemented by performing bin-by-bin multiplication of the frequency-domain representations of the known signal and the unknown signal. Alternatively, estimation unit 402 may be implemented using MMSE or LS techniques.

Figure 1:
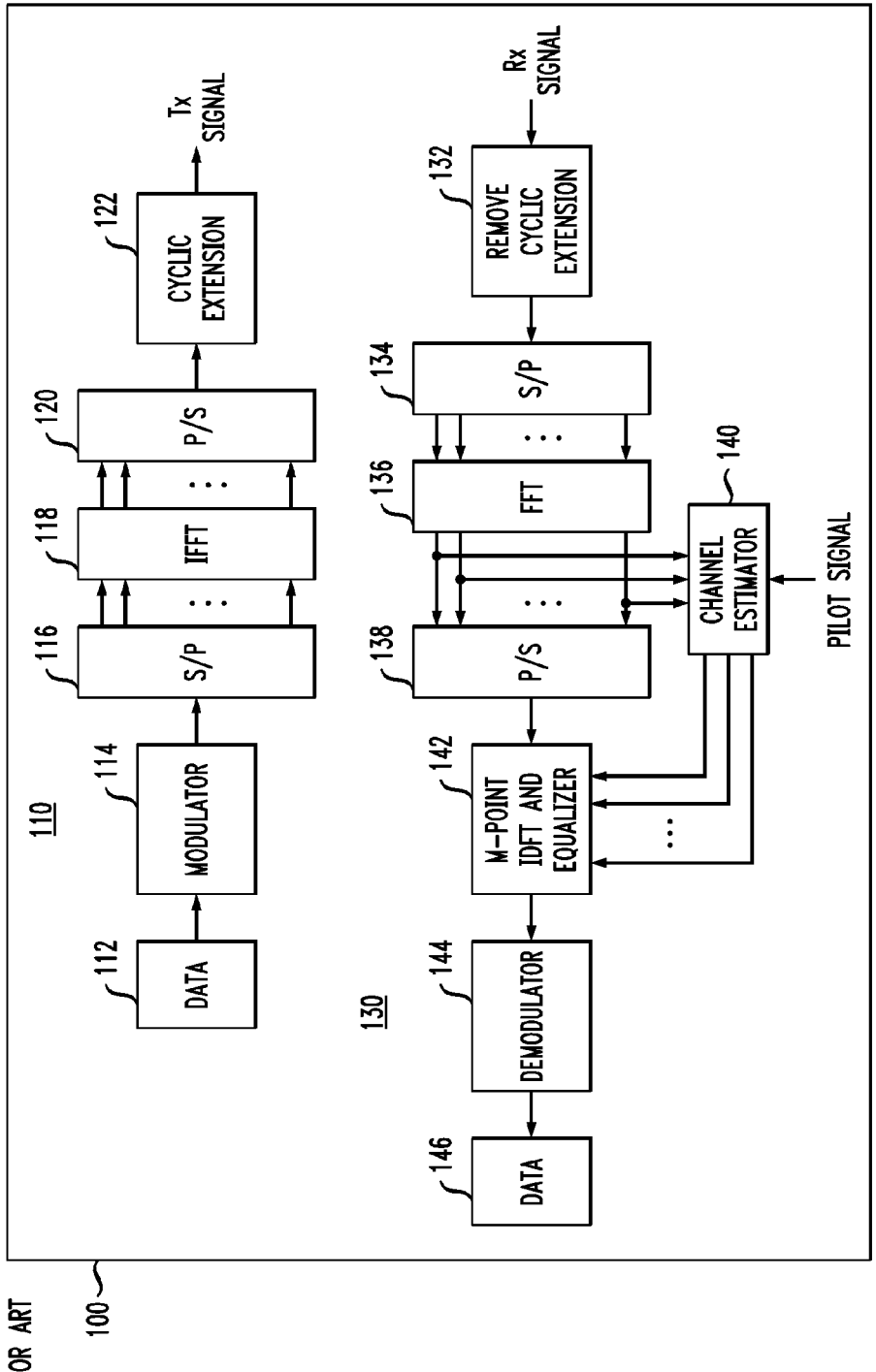
FIG. 1 is a block diagram of a prior-art LTE uplink, including a transmitter and a receiver.

Estimation unit 402 receives, at its input, the N parallel words outputted by FFT 136 shown in FIG. 1, as well as a locally generated frequency-domain representation of the pilot signal. Assuming that estimation unit 402 is implemented as a frequency-domain matched filter as shown in FIG. 4, estimation unit 402 correlates these two signals in the frequency domain by multiplying the frequency-domain received signal by the frequency-domain pilot signal (or vice versa). The result is a frequency-domain correlation signal 404 having M frequency components. Correlation signal 404 represents the combined transfer function corresponding to the transfer functions of the channels between the transmitting antennas (e.g., antennas 202 and 216 of FIG. 2) and the corresponding receiver antenna (e.g., either antenna 214 or antenna 216 of FIG. 2).

Correlation signal 404 is then input to M-point IDFT unit 408, which performs an M-point IDFT to convert correlation signal 404 into a time-domain signal 410. Time-domain signal 410 consists of the concatenation of the impulse responses from all of the transmitter antennas to the receiver antenna, separated by a time delay t of one cyclic shift, assuming that the transmitted signals are formatted in accordance with a cyclic-shift transmit diversity (CSTD) scheme.

Time-domain signal 410 is then input to $T_N$ windowing units 412, in which windowing operations are performed on time-domain signal 410 at $T_N$ different delay values $t_k$ (where k=1 ... $T_N$), using a window of the size of the channel impulse response duration at the signal bandwidth rate $M_u/T_N$. Delay values $t_k$ are preferably defined by $t_k$=k(cyclic shift period), where k=1 ... $T_N$, and $T_N$ is the number of transmitter antennas 202, 204. The channel impulse response duration is predetermined as a system parameter during the design of transmitter antennas 202, 204. The precise location in time of each window is preferably chosen such that the maximum peak is located in the center of the window.

Finally, the windowed, time-domain signal 414 outputted from each windowing unit 412 is input to a corresponding M-point DFT unit 418, which performs an M-point DFT on signal 414 and produces a corresponding frequency-domain output signal 420. Output signals 420 represent the frequency-domain channel responses of the $T_N$ channels, which responses may then be used as channel estimates.

Figure 5:
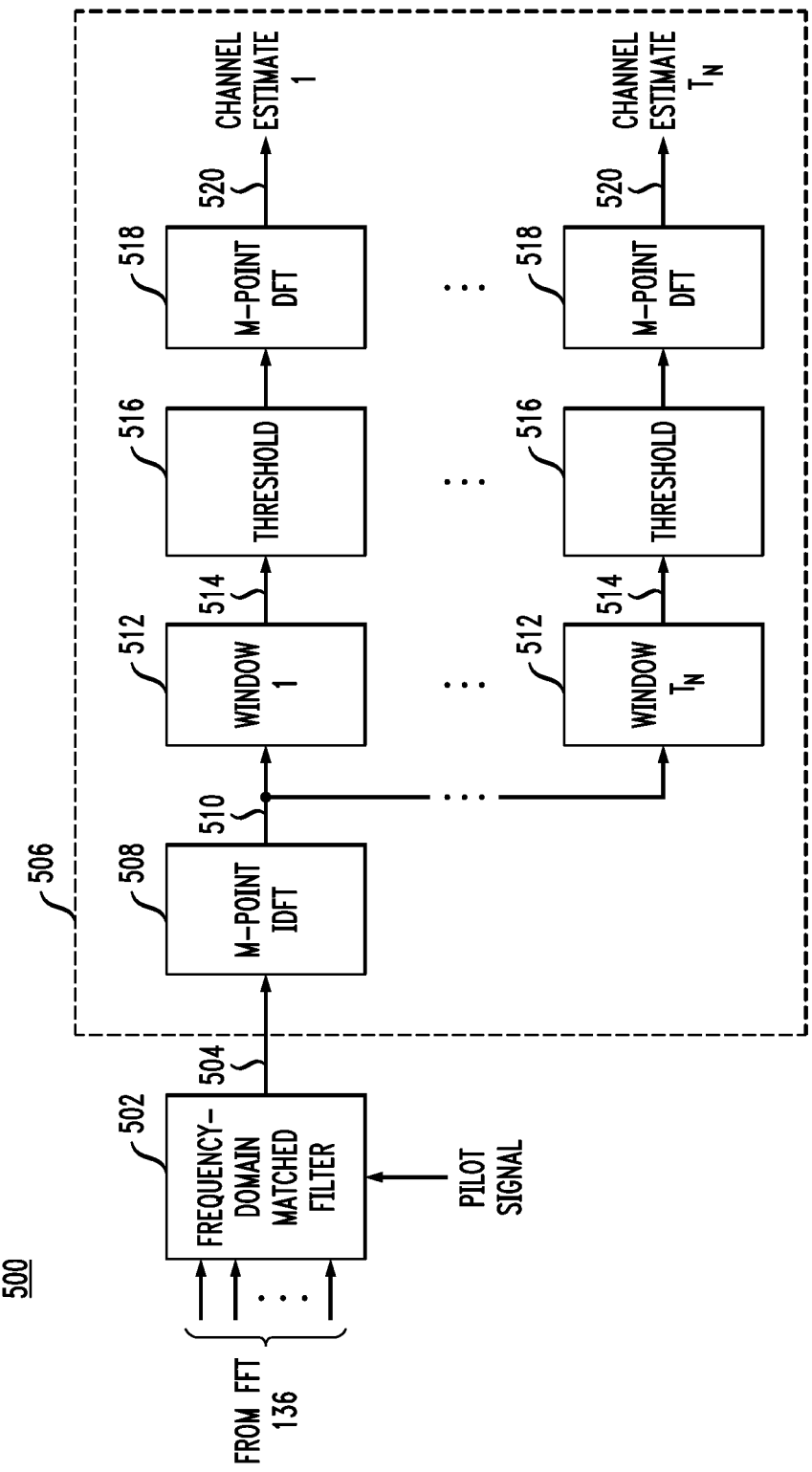
FIG. 5 is a block diagram of a channel estimator employing windowing in the time domain with fewer taps in accordance with another embodiment of the invention.

FIG. 5 shows a block diagram of channel estimator 500, which performs a windowing method with fewer taps (WMFT) for channel estimation, according to another embodiment of the present invention. Channel estimator 500 is similar to channel estimator 400 of FIG. 4 with similar elements and signals identified using labels having the same last two digits, except that separation unit 506 includes $T_N$ thresholding units 516 inserted between windowing units 512 and M-point DFT units 518. Thresholding units 516 compare the power of each tap (i.e., discrete sample) of the windowed, time-domain signals 514 with a noise threshold, and pass to the M-point DFT units 518 only those taps having a power greater than the noise threshold. Taps within signals 514 having a power lower than the noise threshold are dropped or zeroed out. In this manner, fewer than $M_u/T_N$ channel taps are selected for M-point DFT conversion by M-point DFT units 518. Because only those taps having a power greater than the noise floor are used for channel estimation, the resulting channel estimates 520 are more accurate. Moreover, the processing overhead associated with performing M-point DFTs for taps having a power less than the noise floor is avoided. This technique of reducing the channel taps from $M_u/T_N$ channel taps to L channel taps (where L is less than $M_u/T_N$) may be employed for any estimation technique, including estimation via MMSE, LS, and matched-filtering.

Figure 6:
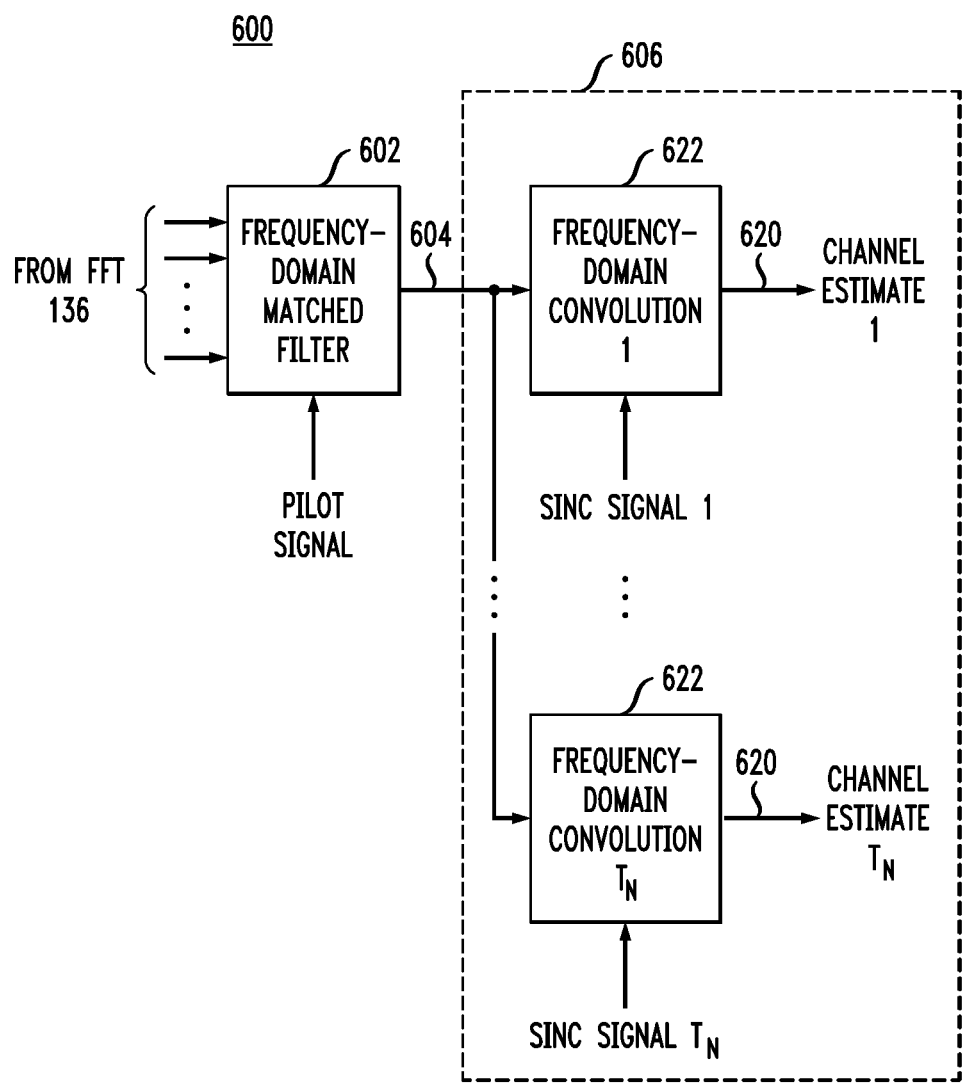
FIG. 6 is a block diagram of a channel estimator employing convolution in the frequency domain in accordance with another embodiment of the invention.

FIG. 6 shows a block diagram of channel estimator 600, which performs a frequency-domain method (FDM) for channel estimation, according to yet another embodiment of the present invention. Channel estimator 600 comprises a frequency-domain matched filter 602 and channel separation unit 606 having $T_N$ frequency-domain convolution units 622. Frequency-domain matched filter 602 receives, at its input, the N parallel words outputted by FFT 136 shown in FIG. 1, as well as a locally generated frequency-domain representation of the pilot signal. Frequency-domain matched filter 602 correlates, in the frequency domain, these two signals by multiplying the frequency-domain received signal by the conjugate of the frequency-domain pilot signal (or vice versa). The result is a frequency-domain correlation signal 604 having M frequency components.

In contrast to the embodiments of FIGS. 4 and 5, however, frequency-domain correlation signal 604 is then input to $T_N$ frequency-domain convolution units 622, which circularly convolve, in the frequency domain, correlation signal 604 with $T_N$ sinc signals (defined as sin(πx)/πx), each having a different phase shift. (A circular convolution of two functions is defined in terms of the periodic extension of one or both functions. Periodic extension means a new function is formed by shifting the original function by multiples of a period T and adding all the copies together. See, e.g., http://en.wikipedia.org/wiki/Circular_convolution, hereby incorporated by reference in its entirety.) Because a sinc function in the frequency domain corresponds to a windowing function in the time domain, the outputs from frequency-domain convolution units 622 constitute the channel frequency responses, which may then be used as channel estimates.

In another embodiment, which may be referred to as the "Frequency-Domain Method with Few Frequency Components" (FDMFFC) for channel estimation, truncated sinc signals, rather than full sinc signals, are convolved with correlation signal 604 at convolution units 622. Whereas a full sinc signal has a number of lobes approaching infinity, the truncated sinc signals have a predetermined number of lobes, which may be represented by a relatively small number of frequency components, e.g., preferably between about 5 and about 20 components, and more preferably about 11 components. This reduction in the number of frequency components of the sinc signals yields saving in the computational complexity of the channel estimator while preserving the estimator performance.

In still another embodiment, which may be referred to as the "Modified Frequency-Domain Method with Few Frequency Components" (MFDMFFC) for channel estimation, frequency-domain convolution units 622 perform (i) normal or linear convolution on the frequency components of correlation signal 604 that correspond to end subcarriers of the received LTE uplink signal and (ii) circular convolution on the frequency components that correspond to the remaining middle subcarriers. End subcarriers are the subcarriers at or near the lowest and highest subcarrier frequencies in the pilot signal, while middle subcarriers are the remaining subcarriers. In one embodiment, about 6 subcarriers in the lowest frequencies and about 5 subcarriers in the highest frequencies may be subjected to linear convolution, and the remaining subcarriers subjected to circular convolution). Performing linear convolution on the end subcarriers' frequency components mitigates edge leakage (i.e., the unintended influence that the highest frequencies and lowest frequencies have on each other in circular convolution, even though they are uncorrelated in practice) that otherwise would arise, because the cyclic application of the sinc function averages across the two edges (i.e., the highest and lowest subcarrier frequencies.)

Complexity Analysis

FIGS. 6 and 7 respectively show Tables 1 and 2. Table 1 indicates computational complexities in terms of number of operations required for channel estimation using the time-domain methods of WM with estimation by MMSE with tap reduction (WMMMSE), by LS with tap reduction (WMLS), by matched-filtering without tap reduction (WMMF), and by matched-filtering with tap reduction (WMFT), for each receiver antenna. Table 2 indicates computational complexities for channel estimation using the frequency-domain methods of FDM, FDMFFC, and MFDMFFC for each receiver antenna.

In all seven methods, received signal Rx_Data is in the time domain, and an M-point DFT is performed to convert the received signal into the frequency domain. See, e.g., row 702 of Table 1. This M-point DFT operation requires O(M log M) arithmetic operations.

The computation of the inverse of the matrix $\vec{R}_{yy}$ for the MMSE estimation of Equation (8), shown in row 704 of Table 1, requires $O(M^3)$ arithmetic operations.

To perform the estimation calculation, e.g., at block 402 of FIG. 4 and at block 502 of FIG. 5, various numbers of arithmetic operations are required for each time-domain method, as shown in row 706 of Table 1 in FIG. 7. In particular, WMMMSE and WMLS require $T_N$ O(M) operations, while WMMF and WMFT require O(M) operations.

In all the time-domain methods, the estimated signal (e.g., signal 404 in FIG. 4 and signal 504 in FIG. 5) is converted back to the time domain by performing an M-point IDFT operation (e.g., at block 408 of FIG. 4 and at block 508 of FIG. 5). In this process, as shown in row 708 of Table 1, WMMMSE, WMLS, and WMFT all require O(ML) arithmetic operations, while WMMF requires O(M log M) arithmetic operations (because no tap reduction is performed in the WMMF method.)

Finally, for all four time-domain methods, converting each estimated channel into the frequency domain to produce an estimated channel frequency response requires $T_N$ O(M log M) arithmetic operations, as shown in row 710 of Table 1.

Among all the time-domain methods, assuming that the down-sampled channel order L is less than log M, WMFT has the least complexity, while WMMMSE has the highest. Unfortunately, however, the number of taps required in the WMFT method varies with the length $M_u$ of the pilot signal and the signal-to-noise ratio (SNR).

Among the frequency-domain methods, from Table 2, it may be observed that FDMFFC and MFDMFFC have lesser complexities than FDM, assuming that L is less than log M. By comparing FIGS. 9 and 10, it may be seen that, unlike WMFT, the number of frequency components needed in FDMFFC (and, therefore, in MFDMFFC as well) is not a function of the pilot-signal length $M_u$. This difference makes the complexity of MFDMFFC less than that of WMFT, especially for long pilot signals. Moreover, this saving in complexity comes with either no degradation or actual improvement in the accuracy of the channel estimation.

Simulation Results

The methods discussed above were simulated in a MAT-LAB® tool by The MathWorks, Inc., of Natick, Mass., using the pseudocode attached in the Appendix and the following parameters. The channel impulse response with $I_C$ taps was defined for the entire bandwidth. Depending on the length $M_u$ of the pilot signal, the channel tap estimates can be down-sampled from the channel order $I_C$ to a preferred channel order L, preferably selected to obtain the lowest possible error variance. The channel order $I_C$ can be defined in terms of transmitted bandwidth B and coherence bandwidth $B_C$ according to the following equation: $I_C = B/B_C$. The coherence bandwidth is defined as $$B_c \approx \frac{1}{5\tau},$$

where τ is the multi-path time-delay spread. In an LTE system, the maximum cyclic prefix is 160 samples, which, in the time domain, is equal to 5.2 μs (given by $160/f_S$, where $f_S$ is the sampling frequency, equal to 30.72 MHz). Generally, the cyclic prefix is usually chosen to be 4-5 times the worst-case delay spread. Hence, the biggest delay spread that this simulated embodiment of the system can mitigate is 1.3 μs (5.2/4). Consequently, the coherence bandwidth $B_C$ is 154 kHz. For a transmitted bandwidth of 20 MHz, the channel order $I_C$ is 133.

Figure 9:
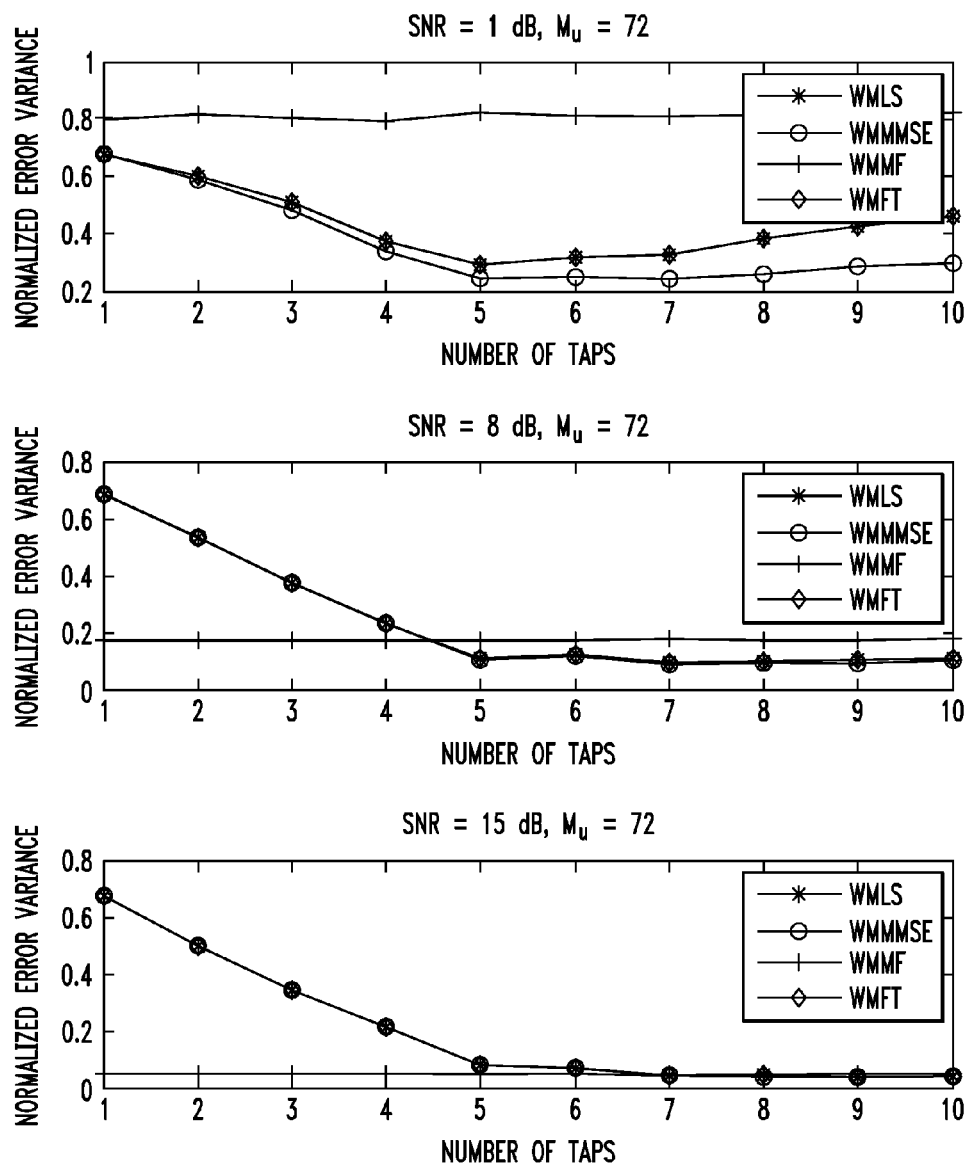
FIG. 9 is a graph illustrating the normalized error variance versus the number of taps for various signal-to-noise ratios (SNRs), evaluated at a pilot signal block length of 72 subcarriers, in accordance with various embodiments of the invention.
Figure 10:
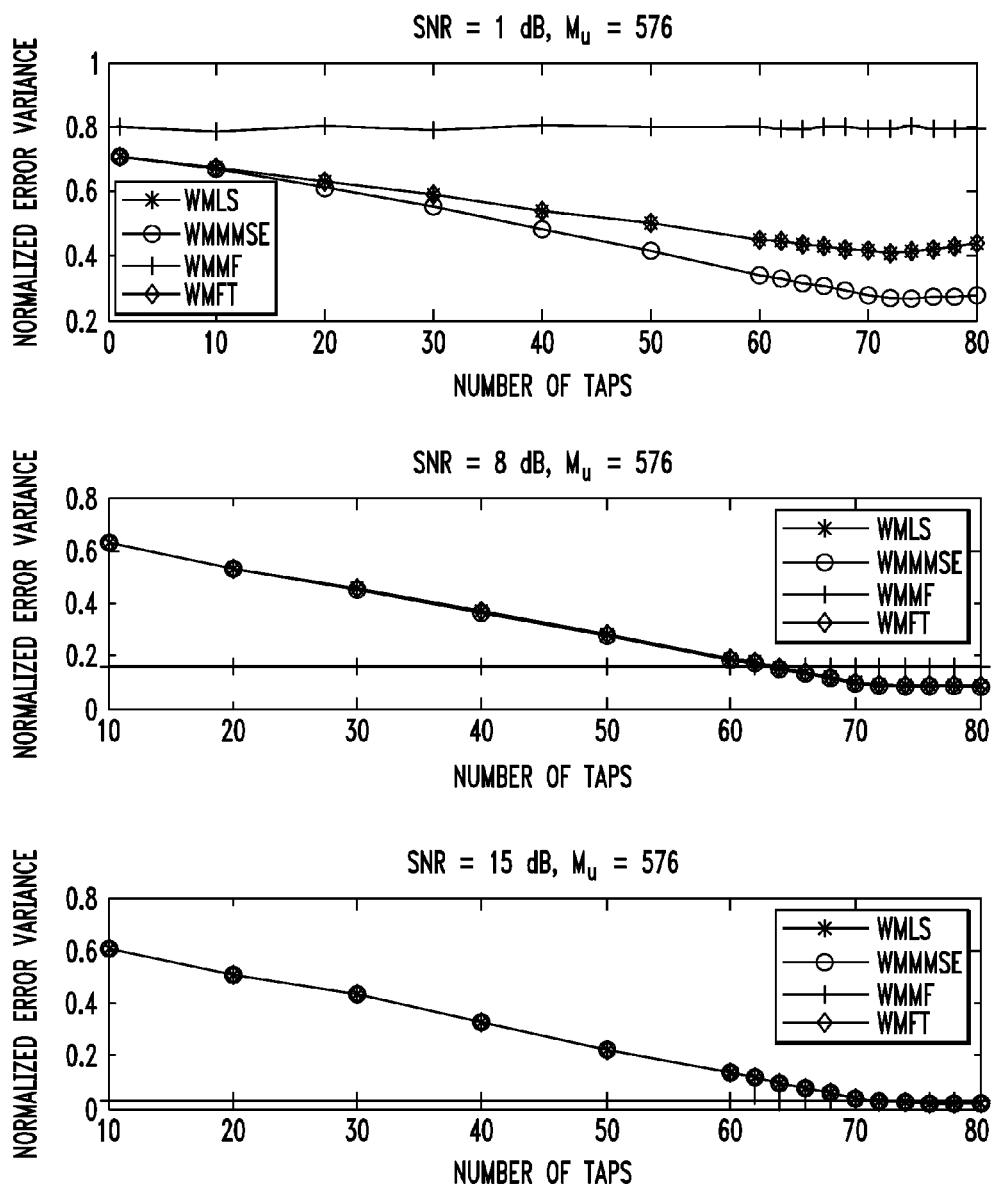
FIG. 10 is a graph illustrating the normalized error variance versus the number of taps for various SNRs, evaluated at a pilot signal block length of 576 subcarriers, in accordance with various embodiments of the invention.

The normalized error variance can be computed as $|\hat{\vec{C}} - \vec{C}|^2$, where $\hat{\vec{C}}$ and $\vec{C}$ are the estimated and actual channel frequency responses, respectively. The performance of the error variance with regard to various numbers of taps and various SNRs, using time-domain methods when four transmitters transmit the signal, are shown in FIGS. 9 and 10 for block lengths of 72 and 576 subcarriers, respectively. The results are tabulated in Table 3 in FIG. 11. From FIGS. 9 and 10, it can be concluded that, after reaching the lowest error variance, the error performance for a low SNR decreases with an increase in the order of the channel. This decrease in error performance arises from the addition of estimates with a poor SNR. However, for a high SNR, the error performance remains the same or has a negligible difference. From FIGS. 9 and 10, for block lengths of 72 and 576 subcarriers, WMMF with 7 and 70 taps, respectively, gives a better performance when compared to other methods.

Figure 12:
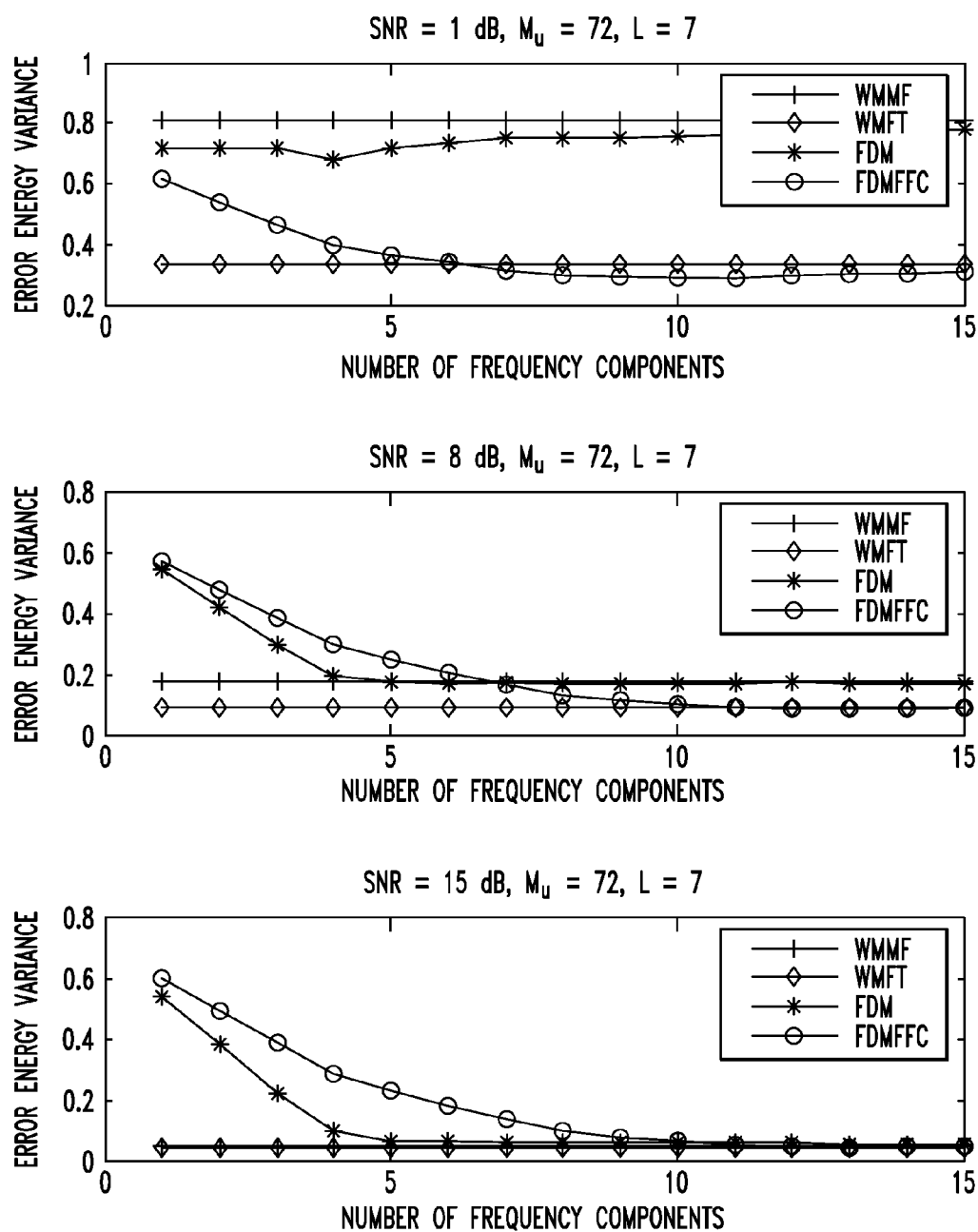
FIG. 12 is a graph illustrating the normalized error variance versus the number of frequency components for various SNRs, evaluated at a pilot signal block length of 72 subcarriers and a channel length of 7 taps in the time domain, in accordance with various embodiments of the invention.
Figure 13:
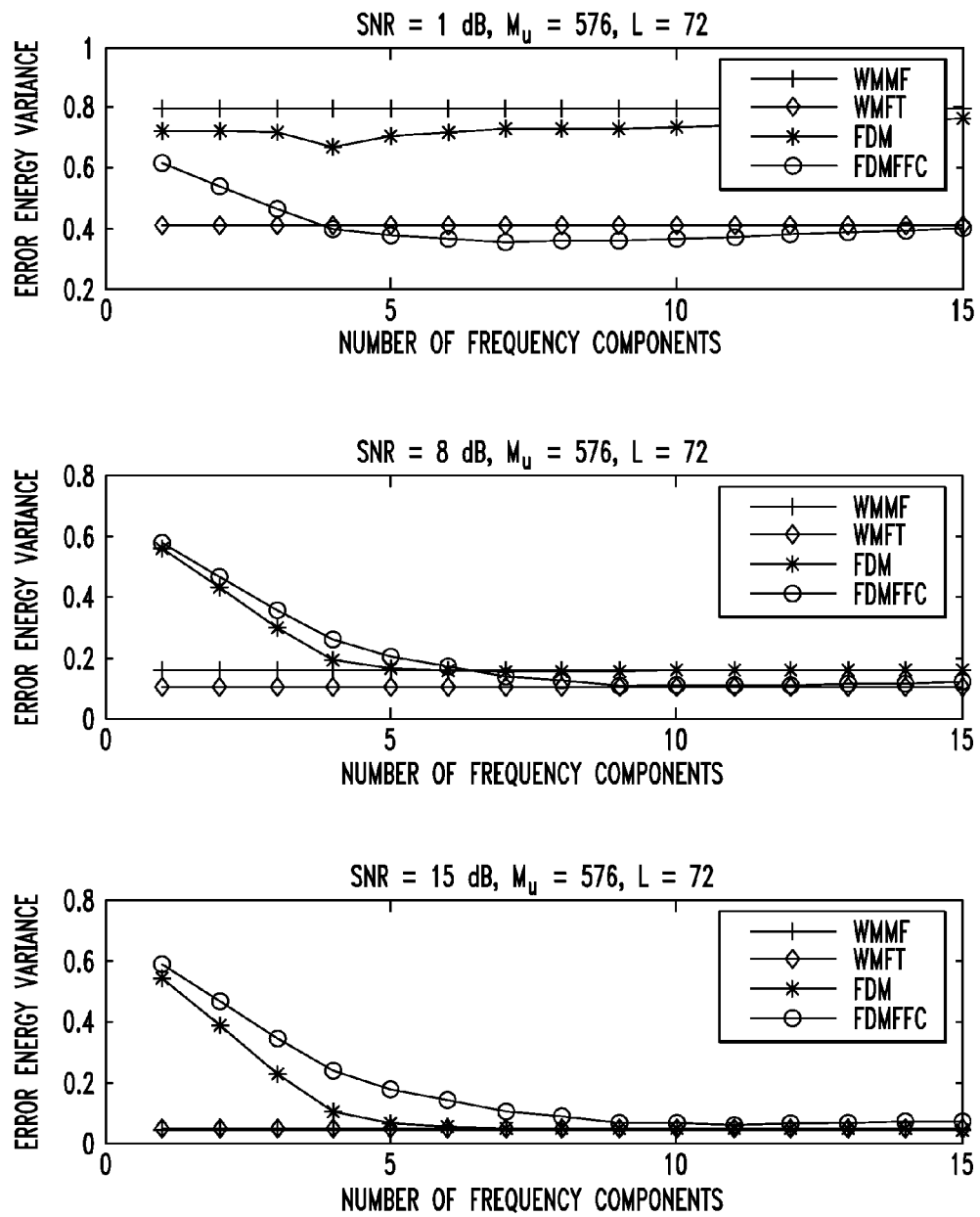
FIG. 13 is a graph illustrating the normalized error variance versus the number of frequency components for different SNRs, evaluated at a pilot signal block length of 576 subcarriers and a channel length of 72 taps in the time domain, in accordance with various embodiments of the invention.

The error performance of WMMF and WMFT for a block length of 72 subcarriers with 18 and 7 taps, respectively, as compared with FDM and FDMFFC, is shown in FIG. 12. For the block length of 576 subcarriers, FIG. 13 compares the error performance of FDM and FDMFFC with the error performance of WMMF and WMFT with 144 and 70 taps, respectively. It can be observed that about 11 frequency components are required to represent the sinc signal, in order to have the error performance comparable or better than that of WMFT. These results are tabulated in Table 4 in FIG. 14. Depending on overall complexity and error performance, one of the above methods can be selected for a given application.

The complexity of WMFT when the length $M_u$ of the pilot signal is 72 and 576 subcarriers (with number of taps equal to 7 and 70, respectively) is 3816 and 75456, respectively (using a mixed-radix implementation for IDFT unit 508 and DFT unit 518 shown in FIG. 5). Similarly, for FDMFFC, the complexity for length $M_u$ equal to 72 and 576 is 3888 and 32832, respectively, when 11 frequency components are chosen for both cases. For a small length $M_u$, the complexity of WMFT and FDMFFC is comparable, whereas, for large length $M_u$, FDMFFC has less complexity than WMFT. In the case of length $M_u$ equal to 576 subcarriers, there is a complexity savings of 56.5%, when FDMFFC is used instead of WMMF.

Figure 15A:
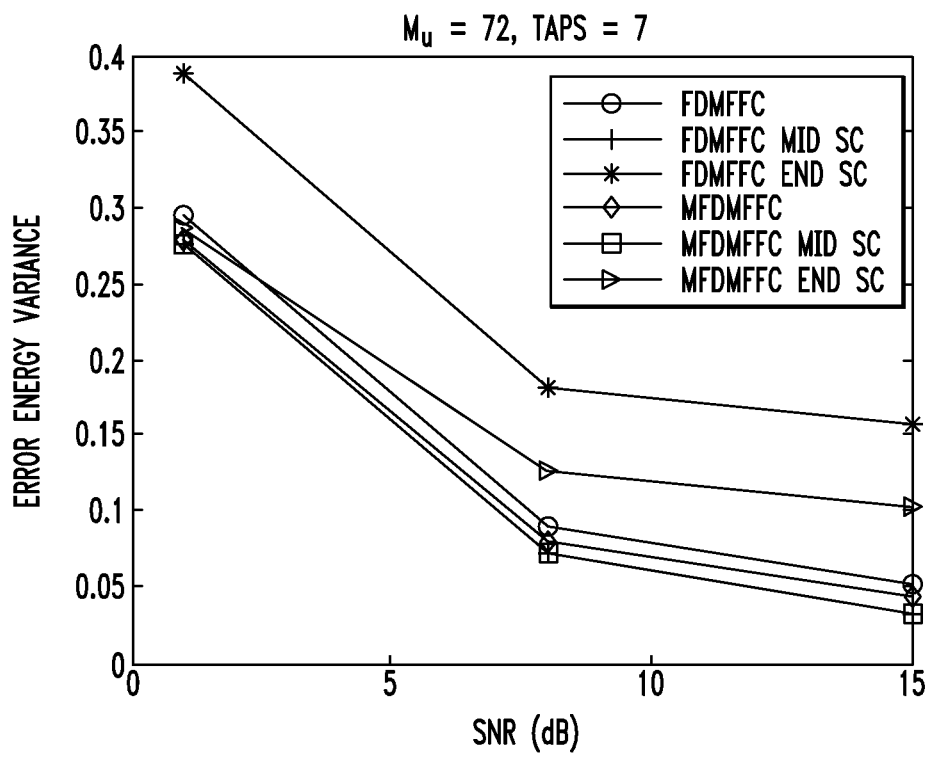
FIGS. 15(a)-(b) are graphs illustrating the normalized error variance versus SNR, when (a) the pilot signal block length is 72 subcarriers and (b) the pilot signal block length is 576 subcarriers, respectively, in accordance with various embodiments of the invention.
Figure 15B:
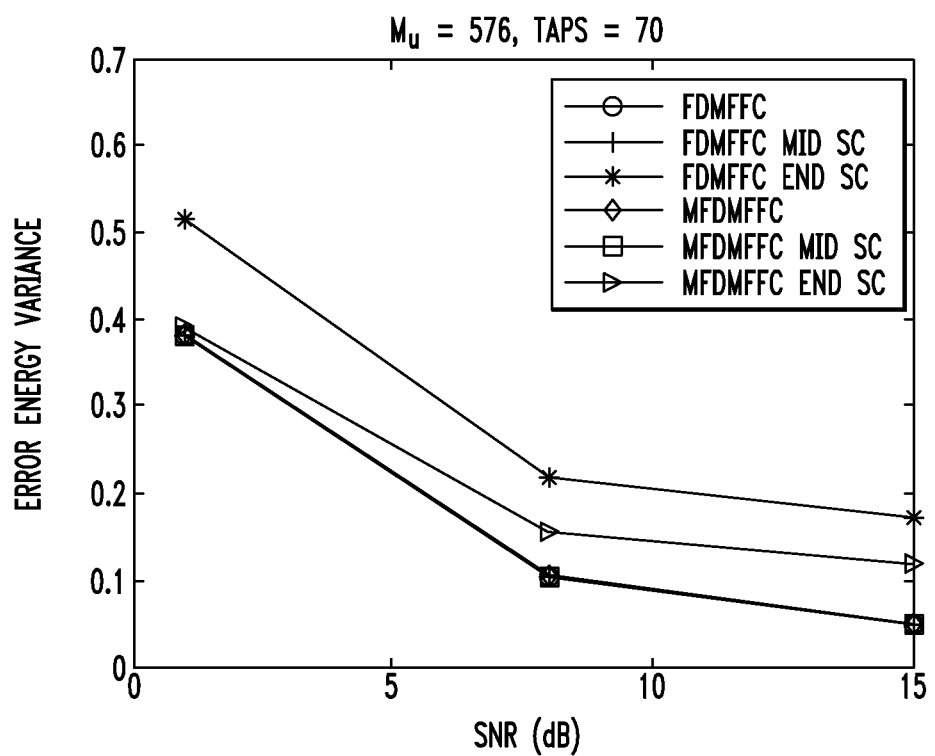

The error performance with regard to the SNR for FDM-FFC and MFDMFFC, when block lengths of 72 and 576 are used, is shown in FIGS. 15(a) and 15(b). In FIGS. 15(a)-(b), FDMFFC and MFDMFFC represent the error performance when all the subcarriers of the pilot signal block are considered. "Mid SC" and "End SC" represent the middle subcarriers (e.g., subcarriers M-11) and end subcarriers (e.g., in one embodiment, about 6 subcarriers in the beginning and about 5 subcarriers at the end of the pilot signal block of length $M_u$) that are considered for error computation. From FIGS. 15(a)-(b), it can be observed that a significant amount of error is introduced by the end subcarriers. Performing linear convolution on the end subcarriers in MFDMFFC mitigates the error in the end subcarriers when compared with circular convolution in FDMFFC.

Based on the above discussion and results, the following conclusions can be surmised. Among all the time-domain methods, WMFT has the best performance, when complexity is considered. With an increase in the pilot signal block length $M_u$, the number of taps required in WMFT increases, whereas the number of frequency components required for representing the sinc function in the frequency-domain methods remains constant. This constancy of the number of frequency components in the frequency-domain methods considerably simplifies the implementation of the frequency-domain methods over time-domain methods and results in a significant saving in computation complexity for large pilot signal block sizes. Further, MFDMFFC advantageously mitigates the degradation of end subcarriers caused by edge leakage.

There has thus been described a number of embodiments of a channel estimator that provide better performance, with less complexity, than existing channel estimators. It will be understood, however, that various changes in the details, materials, and arrangements of the parts which have been described and illustrated in order to explain the nature of this invention may be made by those skilled in the art without departing from the scope of the invention as expressed in the following claims. For example, while certain embodiments above are described as employing convolution of a matched filter output signal with a sinc signal—which is a frequency-domain representation of a rectangular window function in the time domain—frequency-domain representations of other windowing functions may also be used in place of the sinc signal. Such windowing functions may include, but are not limited to, a Hamming window, a Hann window, a cosine window, a Lanczos window, a Bartlett window, a triangular window, a Gaussian window, a Bartlett-Hann window, a Blackman window, a Kaiser window, a Nuttall window, a Blackman-Harris window, a Blackman-Nuttall window, a flat-top window, a Bessel window, an exponential window, and a Tukey window.

It should further be understood that, although channel estimation in the above embodiments is preferably provided by a matched filter, other channel estimation techniques, such as MMSE and LS techniques, may be used in accordance with the present invention.

The present invention may be implemented as analog, digital, or a hybrid of both analog and digital circuit based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro controller, or general purpose computer.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding nodes or ports may be referred to by the same name and are interchangeable for purposes here.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

APPENDIX

```
****************************************************************
1. Code for implementing time-domain methods
****************************************************************
clear all;
clc;
Fil = 0; % Fil = 1 means filter is used and Fil = 0 means no filter
SNR_dB = 1:7:15;
for isnr = 1:length (SNR_dB)
    isnr
    % Parameter Definitions
```

APPENDIX-continued

```
tpct = 0; SNR =SNR_dB(isnr); N = 72; K = 2048; u = 2;
chLen = 100; nTx = 4; cyc = 164; k = 0:N-1;
K1 = K + cyc; zcShift = floor (K/nTx) ;
tap0MaxPos = 10; tapNMaxPos = 133;
E = [ ]; F = [ ]; W = [ ];
primeList = primes(K);
Ng = primeList(find(primeList>=N,1,'first'));
% Cazac Sequence
in = exp(-j*pi*u*k.* (k+1)/Ng);
% Transmitted signal matrix
for iTx = 1:nTx
   delay = (iTx-1)*zcShift;
   in1(iTx,:) = in.*exp(-j*2*pi*(0:N-1)/K*delay);
   E = [E diag(in1(iTx,:))/sqrt(nTx)];
end
map = [in1 zeros(nTx,K-N)]; % Mapping
inTime = ifft(map,K,2)*sqrt(K/nTx); % Input signal in time domain
% Addition of cyclic extention
inCyc = [inTime(:,K-cyc+1:end) inTime];
for tp = 1:10
   taps = tp;
   CE_NR_FILTER_LEN = 9;
   tpct = tpct + 1;
   R1 = eye(taps)/taps;
   R = eye(chLen)*(1/chLen);
   [U,S,V] = svd(R);
   % DFT matrix
   if taps <= 5
      j_j = 1:taps;
   else
      j_j=[N+1-(ceil((taps-5)/2):-1:1) 1:5 5+(1:floor((taps-5)/2))];
   end
   for i = 1:N
      for jj = 1:taps
         jVal = j_j(jj);
         W(i,jj) = exp(-2*j*pi*(i-1)*(jVal-1)/N);
      end
   end
   %Channel Auto-covariance Matrix and DFT matrix
   Rhh = [ ]; F = [ ];
   for iTx = 1:nTx
      Rhh = blkdiag(Rhh,R1);
      F = blkdiag(F,W);
   end
   for ct = 1:100
      % Channel
      ch1 = U*sqrt(S)*[(randn(chLen,nTx)+ . . .
         1j*randn(chLen,nTx))/sqrt(2)];
      tapPos(1) = randint(1,1,[1 tap0MaxPos]);
      tapPos(2:chLen-1) = randint(1,chLen-2, . . .
         [tap0MaxPos+1 tapNMaxPos]);
      tapPos(chLen) = randint(1,1,[tapNMaxPos-10 tapNMaxPos+10]);
      tapPos = sort(tapPos);
      ch = zeros(tapPos(end),nTx);
      ch(tapPos,:) = ch1(1:chLen,:);
      ch0 = fft(ch,K)/sqrt(K);
      ch0 = ch0(1:N,:)*sqrt(K/1); % Channel in frequency domain
      ch0t = ifft(ch0,N);
      ch0 = ch0(:);
      % Received signal
      clear rx1;
      for i = 1:nTx
         rx1(i,:) = conv(inCyc(i,:),ch(:,i));
      end
      nDemodWindow = N/nTx;
      rxRemCyc0 = rx1(:, 164+(1:K)); % Remove Cyclic Extension
      rxRemCyc1 = sum(rxRemCyc0,1);
      % Received signal in frequency domain
      rxFft0 = fft(rxRemCyc1,K,2)/sqrt(K);
      rxDemap0 = rxFft0(1:N); % Demapped the received signal
      % Noise
      noise = sqrt(10^(-SNR/10))*(randn(1,length(rxDemap0)) + . . .
         j*randn(1,length(rxDemap0)))/sqrt(2);
      N0 = 10^(-SNR/10); % Noise variance
      % Received data
      rxDemap = rxDemap0 + noise;
      matFilRxDemap = rxDemap.*conj(in);
      matFilRxDemapTime = ifft(matFilRxDemap,N);
      corrPrecLen = floor(nDemodWindow/2-1);
      if corrPrecLen < 1
```

APPENDIX-continued

```
        corrPrecLen = 1;
      end
      for iTx = 1:nTx
        corrWindowStarts = (iTx-1)*zcShift/K*N + 1;
        corrWindowEnds = corrWindowStarts + nDemodWindow - 1;
        cen = (nDemodWindow/2);
        if taps <= 5
          location = cen + (0:taps-1);
        else
          location = [cen - (ceil((taps-5)/2):-1:1) cen+(0:4) ...
              cen+4+(1:floor((taps-5)/2))];
        end
        corrWindow = (corrWindowStarts:corrWindowEnds)-corrPrecLen;
        corrWindow(corrWindow<1) = corrWindow(corrWindow<1)+N;
        corrNewWindow = corrWindow(location);
        corrOutNewTimeDomainWindowed1 = ...
            matFilRxDemapTime(corrNewWindow)*sqrt(nTx);
        corrOutTimeDomainWindowed = ...
            matFilRxDemapTime(corrWindow)*sqrt(nTx);
        corrOutTimeDomainWindowed = ...
            [ corrOutTimeDomainWindowed(corrPrecLen+1:end) ...
            zeros(1,N-nDemodWindow) ...
            corrOutTimeDomainWindowed(1:corrPrecLen)];
        if taps <= 5
          corrOutNewTimeDomainWindowed = ...
          [corrOutNewTimeDomainWindowed1(1:taps) zeros(1,N-taps)];
        else
        corrOutNewTimeDomainWindowed = ...
          [corrOutNewTimeDomainWindowed1(ceil((taps-5)/2)+1:end) ...
            zeros(1,N-taps) ...
            corrOutNewTimeDomainWindowed1(1:ceil((taps-5)/2))];
        end
        tmp = ...
            reshape(fft(corrOutTimeDomainWindowed,N,2), [1,1,N]);
        tmp = squeeze(tmp);
        tmpNew = ...
            reshape(fft(corrOutNewTimeDomainWindowed,N,2), [1,1,N]);
        tmpNew = squeeze(tmpNew);
        % Filter out estimation noise
        tmp2 = [ones((CE_NR_FILTER_LEN_1)/2,1) ...
            *mean(tmp(1:(CE_NR_FILTER_LEN-1)/2)); tmp; ...
            ones((CE_NR_FILTER_LEN-1)/2,1) ...
            *mean(tmp(end-(CE_NR_FILTER_LEN-1)/2+1:end))];
        tmp3 = filter(ones(1,CE_NR_FILTER-LEN)/ ...
            CE_NR_FILTER_LEN,1,tmp2);
      tmp2New = ...
          [ones((CE_NR_FILTER_LEN-1)/2,1) ...
          *mean(tmpNew(1:(CE_NR_FILTER_LEN-1)/2)); tmpNew; ...
          ones((CE_NR_FILTER_LEN-1)/2,1) ...
          *mean(tmpNew(end-(CE_NR_FILTER_LEN-1)/2+1:end))];
      tmp3New = filter(ones(1,CE_NR_FILTER_LEN)/ ...
          CE_NR_FILTER_LEN,1,tmp2New);
      if Fil == 1
        rxEstChOut(:,iTx) = tmp3(CE_NR_FILTER_LEN:end);
        rxEstChOutNew(:,iTx) = tmp3New(CE_NR_FILTER_LEN:end);
      else
        rxEstChOut(:,iTx) = tmp;
        rxEstChOutNew(:,iTx) = tmpNew;
      end
    end
end
% Channel in time domain
chx = inv(F'*E'*E*F)*F'*E'*rxDemap0.';
chxFft = fft(chx, N,1)/sqrt(1);
% Estimation using MMSE and LS Estimators
hMmse = Rhh*F'*E'*inv(E*F*Rhh*F'*E' + N0*eye(N))*rxDemap.';
hLs = inv(F'*E'*E*F)*F'*E'*rxDemap.';
hMmse1 = reshape(hMmse,taps,nTx);
hLs1 = reshape(hLs,taps,nTx);
if taps <= 5
   hMmse2 = [hMmse1; zeros(N-taps,nTx)];
   hLs2 = [hLs1; zeros(N-taps,nTx)];
else
   hMmse2 = [hMmse1(ceil((taps-5)/2)+1:end,:); ...
      zeros(N-taps,nTx); hMmse1(1:ceil((taps-5)/2),:)];
   hLs2 = [hLs1(ceil((taps-5)/2)1:end,:); ...
      zeros(N-taps,nTx); hLs1(1:ceil((taps-5)/2),:)];
end
% Error in Energy computation using MMSE and LS estimator
hMmseFft = fft(hMmse2,N,1)/sqrt(1);
hMmseFft = hMmseFft(1:N,:);
```

APPENDIX-continued

```
    hMmseFft1 = ...
        [ones((CE_NR_FILTER_LEN-1)/2,1)*...
        mean(hMmseFft(1:(CE_NR_FILTER_LEN-1)/2,:)); hMmseFft;...
        ones((CE_NR_FILTER_LEN-1)/2,1)*...
        mean(hMmseFft(end-(CE_NR_FILTER_LEN-1)/2+1:end,:))];
    hMmseFft2 = filter(ones(1,CE_NR_FILTER_LEN)/...
        CE_NR_FILTER_LEN,1,hMmseFft1);
    hLsFft = fft(hLs2,N,1)/sqrt(1);
    hLsFft = hLsFft(1:N,:);
    hLsFft1 = ...
        [ones((CE_NR_FILTER_LEN-1)/2,1)*...
        mean(hLsFft(1:(CE_NR_FILTER_LEN-1)/2,:)); hLsFft;...
        ones((CE_NR_FILTER_LEN-1)/2,1)*...
        mean(hLsFft(end-(CE_NR_FILTER_LEN-1)/2+1:end,:))];
    hLsFft2 = filter(ones(1,CE_NR_FILTER_LEN)/...
        CE_NR_FILTER_LEN,1,hLsEft1);
    if Fil == 1
        hLsFft3 = hLsFft2(CE_NR_FILTER_LEN:end,:);
        hMmseFft3 = hMmseFft2(CE_NR_FILTER_LEN:end,:);
    else
        hLsFft3 = hLsFft;
        hMmseFft3 = hMmseFft;
    end
        mmseErrorEnergy(ct) = mean((abs(hMmseFft3(:)-ch0).^2));
        lsErrorEnergy(ct) = mean(abs(hLsEft3(:)-ch0).^2);
        rxErrorEnergy(ct) = mean(abs(rxEstChOut(:)-ch0).^2);
        rxErrorEnergyNew(ct) = mean(abs(rxEstChOutNew(:)-ch0).^2);
    end
    lsError(isnr,tpct) = mean(lsErrorEnergy);
    mmseError(isnr,tpct) = mean(mmseErrorEnergy);
    rxError(isnr,tpct) = mean(rxErrorEnergy);
    rxErrorNew(isnr,tpct) = mean(rxErrorEnergyNew);
  end
end
save errorChEst_Ntx4 lsError mmseError rxError rxErrorNew SNR_dB;
figure(1)
subplot(3,1,1);
hold on;plot(abs(lsError(1,:)),'-*r');
hold on; plot(abs(mmseError(1,:)),'-ob');
hold on; plot(abs(rxError(1,:)),'-+g');
hold on; plot(abs(rxErrorNew(1,:)),'-dm');
legend('LS','MMSE','WM','WMFT');
xlabel('No. of Taps');
ylabel('Normalized Error Variance');
% Title('SNR = 1 dB, Filter is used on the estimated channel');
Title('SNR = 1 dB');
subplot(3,1,2);
hold on;plot(abs(lsError(2,:)),'-*r');
hold on; plot(abs(mmseError(2,:)),'-ob');
hold on; plot(abs(rxError(2,:)),'-+g');
hold on; plot(abs(rxErrorNew(2,:)),'-dm');
legend('LS','MMSE','WM','WMFT');
xlabel('No. of Taps');
ylabel('Normalized Error Variance');
% Title('SNR = 8 dB, Filter is used on the estimated channel');
Title('SNR = 8 dB');
subplot(3,1,3);
hold on;plot(abs(lsError(3,:)),'-*r');
hold on; plot(abs(mmseError(3,:)),'-ob');
hold on; plot(abs(rxError(3,:)),'-+g');
hold on; plot(abs(rxErrorNew(3,:)),'-dm');
legend('LS','MMSE','WM','WMFT');
xlabel('No. of Taps');
ylabel('Normalized Error Variance');
% Title('SNR = 15 dB Filter is used on the estimated channel');
Title('SNR = 15 dB');
*****************************************************
2. Code for implementation of WM, WMFT, FDM, and FDMFFC
*****************************************************
clear all;
clc;
SNR_dB = 1:7:15;
for isnr = 1:length (SNR_dB)
    isnr
    % Parameter Definitions
    tpct = 0; SNR = SNR_dB(isnr); N = 72; taps = 7; K = 2048; u = 2;
    chLen = 100; nTx = 4; cyc = 164; k = 0:N-1;
    K1 = K + cyc; zcShift = floor (K/nTx);
    tap0MaxPos = 10; tapNMaxPos = 133;
    E = [ ]; F = [ ]; W = [ ];
```

APPENDIX-continued

```
primeList = primes(K);
Ng = primeList(find(primeList>=N,1,'first'));
% Cazac Sequence
in = exp(-j*pi*u*k.*(k+1)/Ng);
% Transmitted signal matrix
for iTx = 1:nTx
    delay = (iTx-1)*zcShift;
    in1(iTx,:) = in.*exp(-j*2*pi*(0:N-1)/K*delay);
    E = [E diag(in1(iTx,:))/sqrt(nTx)];
end
map = [in1 zeros(nTx,K-N)]; % Mapping
inTime = ifft(map,K,2)*sqrt(K/nTx); % Input signal in time domain
% Addition of cyclic extention
inCyc = [inTime(:,K-cyc+1:end) inTime];
sincFnWindow = zeros(nTx,N);
sincFnNewWindow = zeros(nTx,N);
CE_NR_FILTER_LEN = 9;
tpct = tpct + 1;
R1 = eye(taps)/taps;
R = eye(chLen)*(1/chLen);
[U,S,V] = svd(R);
for ct = 1:100
    % Channel
    ch1 = U*sqrt(S)*[(randn(chLen,nTx)+ ...
        1j*randn(chLen,nTx))/sqrt(2)];
    tapPos(1) = randint(1,1,[1 tap0MaxPos]);
    tapPos(2:chLen-1) = randint(1,chLen-2, ...
        [tap0MaxPos+1 tapNMaxPos]);
    tapPos(chLen) = randint(1,1,[tapNMaxPos-10 tapNMaxPos+10]);
    tapPos = sort(tapPos);
    ch = zeros(tapPos(end),nTx);
    ch(tapPos,:) = ch1(1:chLen,:);
    ch0 = fft(ch,K)/sqrt(K);
    ch0 = ch0(1:N,:)*sqrt(K/1); % Channel in frequency domain
    ch0t = ifft(ch0,N);
    ch0 = ch0(:);
    % Received signal
    clear rx1;
    for i = 1:nTx
        rx1(i,:) = conv(inCyc(i,:),ch(:,i));
    end
    nDemodWindow = N/nTx;
    rxRemCyc0 = rx1(:, 164+(1:K)); % Remove Cyclic Extension
    rxRemCyc1 = sum(rxRemCyc0,1);
    % Received signal in frequency domain
    rxFft0 = fft(rxRemCyc1,K,2)/sqrt(K);
    rxDemap0 = rxFft0(1:N); % Demapped the received signal
    % Noise
    noise = sqrt(10^(-SNR/10))*(randn(1,length(rxDemap0)) + ...
        j*randn(1,length(rxDemap0)))/sqrt(2);
    N0 = 10^(-SNR/10); % Noise variance
    % Received data
    rxDemap = rxDemap0 + noise;
    matFilRxDemap = rxDemap.*conj(in);
    matFilRxDemapTime = ifft(matFilRxDemap,N);
    corrPrecLen = floor(nDemodWindow/2-1);
    if corrPrecLen < 1
        corrPrecLen = 1;
    end
    for iTx = 1:nTx
        corrWindowStarts = (iTx-1)*zcShift/K*N + 1;
        corrWindowEnds = corrWindowStarts + nDemodWindow - 1;
        cen = (nDemodWindow/2);
        if taps <= 5
            location = cen + (0:taps-1);
        else
            location = [cen - (ceil((taps-5)/2):-1:1) cen+(0:4) ...
                cen+4+(1:floor((taps-5)/2))];
        end
        corrWindow = (corrWindowStarts:corrWindowEnds)-corrPrecLen;
        corrWindow(corrWindow<1) = corrWindow(corrWindow<1)+N;
        corrNewWindow = corrWindow(location);
        sincFnNewWindow(iTx, corrNewWindow) = ...
            ones(1,length(corrNewWindow));
        sincFnWindow(iTx, corrWindow) = ones(1,length(corrWindow));
        corrOutTimeDomainWindowed = ...
            matFilRxDemapTime(corrWindow)*sqrt(nTx);
        corrOutTimeDomainWindowed = ...
            [ corrOutTimeDomainWindowed(corrPrecLen+1:end) ...
            zeros(1,N-nDemodWindow) ...
```

APPENDIX-continued

```
            corrOutTimeDomainWindowed(1:corrPrecLen)];
        tmp = ...
            reshape(fft(corrOutTimeDomainWindowed,N,2), [1,1,N]);
        tmp = squeeze(tmp);
        corrOutNewTimeDomainWindowed1 = ...
            matFilRxDemapTime(corrNewWindow)*sqrt(nTx);
        if taps <= 5
            corrOutNewTimeDomainWindowed = ...
                [corrOutNewTimeDomainWindowed1(1:taps) zeros(1,N-taps)];
        else
            corrOutNewTimeDomainWindowed = ...
                [corrOutNewTimeDomainWindowed1(ceil((taps-5)/2)+1:end) ...
                    zeros(1,N-taps) ...
                    corrOutNewTimeDomainWindowed1(1:ceil((taps-5)/2))];
        end
        tmpNew = ...
            reshape(fft(corrOutNewTimeDomainWindowed,N,2), [1,1,N]);
        tmpNew = squeeze(tmpNew);
        rxEstChOut(:,iTx) = tmp;
        rxEstChOutNew(:,iTx) = tmpNew;
    end
    sincFnFftWindow = fft(sincFnWindow,N,2)/(2*N/nTx);
    sincFnFftNewWindow = fft(sincFnNewWindow,N,2)/(2*N/nTx);
    for tapsF = 1:20
        sincFnFftWindow1 = sincFnFftWindow;
        sincFnFftNewWindow1 = sincFnFftNewWindow;
        sincFnFftWindow1(:,floor(tapsF/2)+2:N-floor((tapsF-1)/2))= ...
            zeros(nTx,N-tapsF);
        sincFnFftNewWindow1(:,floor(tapsF/2)+2:N-floor((tapsF-1)/2)) ...
            = zeros(nTx,N-tapsF);
        matOutput = [matFilRxDemap matFilRxDemap];
        for iTx = 1:nTx
            sincConvWindow(:,iTx) = ...
                conv(matOutput,sincFnFftWindow1(iTx,:));
            sincConvNewWindow(:,iTx) = ...
                conv(matOutput,sincFnFftNewWindow1(iTx,:));
        end
        sincEstWindow = sincConvWindow((1:N)+N,:);
        sincEstNewWindow = sincConvNewWindow((1:N)+N,:);
        sincEstTransWindow = sincEstWindow.';
        sincEstTransNewWindow = sincEstNewWindow.';
        clear sincEstLWindow sincEstLNewWindow;
        for iTx = 1:nTx
            delay = (iTx-1)*floor(N/nTx);
            sincEstLWindow(iTx,:) = sincEstTransWindow(iTx,:).* ...
                exp(j*2*pi*(0:N-1)/N*delay);
            sincEstLNewWindow(iTx,:) = sincEstTransNewWindow(iTx,:).* ...
                exp(j*2*pi*(0:N-1)/N*delay);
        end
        sincWindowEst = sincEstLWindow.';
        sincNewWindowEst = sincEstLNewWindow.';
        sincErrorEnergyWindow(ct,tapsF) = ...
            mean(abs(sincWindowEst(:)-ch0).^2);
        sincErrorEnergyNewWindow(ct,tapsF) = ...
            mean(abs(sincNewWindowEst(:)-ch0).^2);
        rxErrorEnergy(ct,tapsF) = mean(abs(rxEstChOut(:)-ch0).^2);
        rxErrorEnergyNew(ct,tapsF) = ...
            mean(abs(rxEstChOutNew(:)-ch0).^2);
    end
end
rxError(isnr,:) = mean(rxErrorEnergy);
rxErrorNew(isnr,:) = mean(rxErrorEnergyNew);
sincErrorWindow(isnr,:) = mean(sincErrorEnergyWindow);
sincErrorNewWindow(isnr,:) = mean(sincErrorEnergyNewWindow);
end
figure(1);
title('N = 72, taps = 5');
subplot(3,1,1); hold on;
plot(abs(rxError(1,:)),'-+g');
plot(abs(rxErrorNew(1,:)),'-dm');
plot(abs(sincErrorWindow(1,:)),'-*b');
plot(abs(sincErrorNewWindow(1,:)),'-or');
legend('WM','WMFT','FDM','FDMFFC')
xlabel('No. of Frequency Components');
ylabel('Error energy variance');
title('SNR = 1 dB');
subplot(3,1,2); hold on;
plot(abs(rxError(2,:)),'-+g');
plot(abs(rxErrorNew(2,:)),'-dm');
plot(abs(sincErrorWindow(2,:)),'-*b');
```

```
plot(abs(sincErrorNewWindow(2,:)),'-or');
legend('WM','WMFT','FDM','FDMFFC)
xlabel('No. of Frequency Components');
ylabel('Error energy variance');
title('SNR = 8 dB');
subplot(3,1,3); hold on;
plot(abs(rxError(3,:)),'-+g');
plot(abs(rxErrorNew(3,:)),'-dm');
plot(abs(sincErrorWindow(3,:)),'-*b');
plot(abs(sincErrorNewWindow(3,:)),'-or');
legend('WM','WMFT','FDM','FDMFFC)
xlabel('No. of Frequency Components');
ylabel('Error energy variance');
title('SNR = 15 dB');
%**********************************************
3. Code for implementation of FDMFFC and MFDMFFC
%**********************************************
clear all;
clc;
SNR_dB = 1:7:15;
for isnr = 1:length (SNR_dB)
    isnr
    % Parameter Definitions
    tpct = 0; SNR = SNR_dB(isnr); N = 576; taps = 72; K = 2048; u = 2;
    chLen = 100; nTx = 4; cyc = 164; k = 0:N-1;
    K1 = K + cyc; zcShift = floor(K/nTx);
    tap0MaxPos = 10; tapNMaxPos = 133;
    E = [ ]; F = [ ]; W = [ ]
    primeList = primes(K);
    Ng = primeList(find(primeList>=N,1,'first'));
    % Cazac Sequence
    in = exp(-j*pi*u*k.*(k+1)/Ng);
    % Transmitted signal matrix
    for iTx = 1:nTx
        delay = (iTx-1)*zcShift;
        in1(iTx,:) = in.*exp(-j*2*pi*(0:N-1)/K*delay);
        E = [E diag(in1(iTx,:))/sqrt(nTx)];
    end
    map = [in1 zeros(nTx,K-N)]; % Mapping
    inTime = ifft(map,K,2)*sqrt(K/nTx); % Input signal in time domain
    % Addition of cyclic extention
    inCyc = [inTime(:,K-cyc+1:end) inTime];
    sincFnNew = zeros(nTx,N);
    CE_NR_FILTER_LEN = 9;
    tpct = tpct + 1;
    R1 = eye(taps)/taps;
    R = eye(chLen)*(1/chLen);
    [U,S,V] = svd(R);
    for ct = 1:100
        % Channel
        ch1 = U*sqrt(S)*[(randn(chLen,nTx)+ ...
            1j*randn(chLen,nTx))/sqrt(2)];
        tapPos(1) = randint(1,1,[1 tap0MaxPos]);
        tapPos(2:chLen-1) = randint(1,chLen-2, ...
            [tap0MaxPos+1 tapNMaxPos]);
        tapPos(chLen) = randint(1,1,[tapNMaxPos-10 tapNMaxPos+10]);
        tapPos = sort(tapPos);
        ch = zeros(tapPos(end),nTx);
        ch(tapPos,:) = ch1(1:chLen,:);
        ch0 = fft(ch,K)/sqrt(K);
        ch0 = ch0(1:N,:)*sqrt(K/1); % Channel in frequency domain
        % Received signal
        clear rx1;
        for i = 1:nTx
            rx1(1,:) = conv(inCyc(i,:),ch(:,i));
        end
        nDemodWindow = N/nTx;
        rxRemCyc0 = rx1(:, 164+(1:K)); % Remove Cyclic Extension
        rxRemCyc1 = sum(rxRemCyc0,1);
        % Received signal in frequency domain
        rxFft0 = fft(rxRemCyc1,K,2)/sqrt(K);
        rxDemap0 = rxFft0(1:N); % Demapped the received signal
        % Noise
        noise = sqrt(10^(-SNR/10))*(randn(1,length(rxDemap0)) + ...
            j*randn(1,lengh(rxDemap0)))/sqrt(2);
        N0 = 10^(-SNR/10); % Noise variance
        % Received data
        rxDemap = rxDemap0 + noise;
        matFilRxDemap = rxDemap.*conj(in);
        matFilRxDemapTime = ifft(matFilRxDemap,N);
```

APPENDIX-continued

```
      corrPrecLen = floor(nDemodWindow/2−1);
      for iTx = 1:nTx
         corrWindowStarts = (iTx−1)*zcShift/K*N + 1;
         corrWindowEnds = corrWindowStarts + nDemodWindow − 1;
         cen = (nDemodWindow/2);
         if taps <= 5
            location = cen + (0:taps−1);
         else
            location = [cen − (ceil((taps−5)/2):−1:1) cen+(0:4) ...
               cen+4+(1:floor((taps−5)/2))];
         end
         corrWindow = (corrWindowStarts:corrWindowEnds)−corrPrecLen;
         corrWindow(corrWindow<1) = corrWindow(corrWindow<1)+N;
         corrNewWindow = corrWindow(location);
         sincFnNew(iTx, corrNewWindow) = ones(1,length(corrNewWindow));
      end
      sincFnNewFft = fft(sincFnNew,N,2)/(2*N/nTx);
      for tapsF = 11
         sincFnNewFft1 = sincFnNewFft;
         sincFnNewFft1(:,floor(tapsF/2)+2:N− ...
            floor((tapsF−1)/2))=zeros(nTx,N−tapsF);
         matOp = [matFilRxDemap matFilRxDemap];
         matOutput = [zeros(1,ceil(tapsF/2)) matFilRxDemap ...
            zeros(1,floor(tapsF/2))];
         sincNewWindow = ...
            [sincFnNewFft1(:,N−floor((tapsF−1)/2)+1:end) ...
            sincFnNewFft1(:,1:floor(tapsF/2)+1)];
         for iTx = 1:nTx
            sincConvLin(:,iTx) = conv(matOutput,sincNewWindow(iTx,:));
            sincConvCirc(:,iTx) = conv(matOp,sincFnNewFft1(iTx,:));
         end
         sincEstLinConv = sincConvLin((1:N)+tapsF,:);
         sincEstCircConv = sincConvCirc((1:N)+N,:);
         sincEstTrans = sincEstCircConv.';
         sincEstTransNew = sincEstLinConv.';
         clear sincEstL sincEstLNew;
         for iTx = 1:nTx
            delay = (iTx−1)*floor(N/nTx);
            sincEstL(iTx,:) = sincEstTrans(iTx,:).* ...
               exp(j*2*pi*(0:N−1)/N*delay);
            sincEstLNew(iTx,:) = sincEstTransNew(iTx,:).* ...
               exp(j*2*pi*(0:N−1)/N*delay);
         end
%        sincEstL = sincEstL.';
         sincEst3 = sincEstL.';
         sincEst3New = sincEstLNew.';
         ch0SincRemEnds(1:N−2*cell(tapsF/2),:) = ...
            ch0(cell(tapsF/2)+1:N−cell(tapsF/2),:);
         ch0SincEnds(1:2*cell(tapsF/2),:) = ...
            [ch0(1:cell(tapsF/2),:); ch0(N−cell(tapsF/2)+1:end,:)];
         sincEst3RemEnds(1:N−2*cell(tapsF/2),:) = ...
            sincEst3(cell(tapsF/2)+1:N−cell(tapsF/2),:);
         sincEst3NewRemEnds(1:N−2*cell(tapsF/2),:) = ...
            sincEst3New(cell(tapsF/2)+1:N−cell(tapsF/2),:);
         sincEst3Ends(1:2*cell(tapsF/2),:) = ...
            [sincEst3(1:cell(tapsF/2),:); ...
            sincEst3(N−cell(tapsF/2)+1:end,:)];
         sincEst3NewEnds(1:2*cell(tapsF/2),:) = ...
            [sincEst3New(1:cell(tapsF/2),:); ...
            sincEst3New(N−cell(tapsF/2)+1:end,:)];
         sincErrorEnergyRemEnds = ...
            mean(abs(sincEst3RemEnds(:)−ch0SincRemEnds(:)).^2);
         sincErrorEnergyNewRemEnds = ...
            mean(abs(sincEst3NewRemEnds(:)−ch0SincRemEnds(:)).^2);
         sincErrorEnergyEnds = ...
            mean(abs(sincEst3Ends(:)−ch0SincEnds(:)).^2);
         sincErrorEnergyNewEnds = ...
            mean(abs(sincEst3NewEnds(:)−ch0SincEnds(:)).^2);
         sincErrorEnergy = mean(abs(sincEst3(:)−ch0(:)).^2);
         sincErrorEnergyNew = mean(abs(sincEst3New(:)−ch0(:)).^2);
      end
      ErrorEnergySinc(ct) = sincErrorEnergy;
      ErrorEnergySincNew(ct) = sincErrorEnergyNew;
      ErrorEnergySincRemEnds(ct) = sincErrorEnergyRemEnds;
      ErrorEnergySincNewRemEnds(ct) = sincErrorEnergyNewRemEnds;
      ErrorEnergySincEnds(ct) = sincErrorEnergyEnds;
      ErrorEnergySincNewEnds(ct) = sincErrorEnergyNewEnds;
   end
   sincError(isnr) = mean(ErrorEnergySinc);
   sincErrorNew(isnr) = mean(ErrorEnergySincNew);
```

APPENDIX-continued

```
    sincErrorRemEnds(isnr) = mean(ErrorEnergySincRemEnds);
    sincErrorNewRemEnds(isnr) = mean(ErrorEnergySincNewRemEnds);
    sincErrorEnds(isnr) = mean(ErrorEnergySincEnds);
    sincErrorNewEnds(isnr) = mean(ErrorEnergySincNewEnds);
end
figure(3);
plot(SNR_dB,sincError,'-or');
hold on;
plot(SNR_dB,sincErrorRemEnds,'-+b');
plot(SNR_dB,sincErrorEnds,'-*m');
plot(SNR_dB,sincErrorNew,'-dr');
plot(SNR_dB,sincErrorNewRemEnds,'-sb');
plot(SNR_dB,sincErrorNewEnds,'->m');
legend('FDMFFC','FDMFFC Mid SC', 'FDMFFC End SC','MFDMFFC','MFDMFFC
Mid SC','MFDMFFC End SC' );
xlabel('SNR (dB)');
ylabel('Error energy variance');
title('N = 576, taps = 72');
```

We claim:

1. A method of estimating a plurality of estimated transfer functions corresponding to a plurality of wireless channels in a multiple-input system that includes a receiving antenna receiving a time-domain signal corresponding to a plurality of signals transmitted from a plurality of transmitting antennas, the method comprising:
   a transform unit transforming the time-domain signal into a frequency-domain signal;
   a channel estimation unit estimating, based on the frequency-domain signal and a frequency-domain pilot signal, a combined transfer function corresponding to a plurality of transfer functions of respective channels between the plurality of transmitting antennas and the receiving antenna; and
   a channel separation unit separating the combined transfer function into a plurality of estimated channel transfer functions by convolving, in the frequency domain, the combined transfer function with a plurality of windowing functions, wherein the method further comprises one or more of the following steps:
   convolving, in the frequency domain, the combined transfer function with a respective frequency-domain representation of a windowing function;
   phase-shifting each one of the plurality of windowing functions, such that a phase of each windowing function is different than the phase of each other windowing function;
   circularly convolving, in the frequency domain, the combined transfer function with the respective frequency-domain representation of the windowing function; and
   circularly convolving, in the frequency domain, components corresponding to middle subcarriers of the combined transfer function with the respective frequency-domain representation of the windowing function, and (b) linearly convolving, in the frequency domain, components corresponding to end subcarriers of the combined transfer function with the respective frequency-domain representation of the windowing function.

2. The method of claim 1, wherein convolving the combined transfer function with a plurality of windowing functions comprises convolving, in the frequency domain, the combined transfer function with a respective frequency-domain representation of a windowing function.

3. The method of claim 2, wherein the windowing function for each convolution unit is phase-shifted from the windowing function of each other convolution unit.

4. The method of claim 2, wherein convolving the combined transfer function with a plurality of windowing functions comprises convolving, in the frequency domain, the combined transfer function with the respective frequency-domain representation of each windowing function.

5. The method of claim 2, wherein:
   the combined transfer function includes components corresponding to end subcarriers and components corresponding to middle subcarriers, and
   each convolution unit (a) circularly convolves, in the frequency domain, the components corresponding to the middle subcarriers with the respective frequency-domain representation of the windowing function, and (b) linearly convolves, in the frequency domain, the components corresponding to the end subcarriers with the respective frequency-domain representation of the windowing function.

6. The method of claim 5, wherein linearly convolving the components corresponding to the end subcarriers with the respective frequency-domain representation of the windowing function reduces edge leakage between higher-frequency end subcarriers and lower-frequency end subcarriers.

7. The method of claim 2, wherein the frequency-domain representation of the windowing function is a sinc signal.

8. The method of claim 2, wherein the frequency-domain representation of the windowing function is frequency-truncated.

9. The method of claim 8, wherein the frequency-truncated, frequency-domain representation of the windowing function is a sinc signal having a predetermined number of frequency components.

10. The method of claim 1, wherein the channel estimation unit comprises one of a minimum mean-square-error unit and a least-square unit.

* * * * *